(12) United States Patent
Hiwatashi

(10) Patent No.: US 12,441,065 B2
(45) Date of Patent: Oct. 14, 2025

(54) FORMED ARTICLE, WELDING METHOD, AND METHOD OF MANUFACTURING FORMED ARTICLE

(71) Applicant: ASAHI KASEI KABUSHIKI KAISHA, Tokyo (JP)

(72) Inventor: Kenta Hiwatashi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/285,533

(22) PCT Filed: Jan. 23, 2023

(86) PCT No.: PCT/JP2023/001843
§ 371 (c)(1),
(2) Date: Oct. 4, 2023

(87) PCT Pub. No.: WO2023/203819
PCT Pub. Date: Oct. 26, 2023

(65) Prior Publication Data
US 2025/0042095 A1 Feb. 6, 2025

(30) Foreign Application Priority Data
Apr. 22, 2022 (JP) .................................. 2022-070984

(51) Int. Cl.
*B29C 65/16* (2006.01)
*B29C 65/00* (2006.01)
(Continued)

(52) U.S. Cl.
CPC .......... *B29C 65/1638* (2013.01); *B29C 66/71* (2013.01); *B29C 66/73365* (2013.01);
(Continued)

(58) Field of Classification Search
CPC . B29C 65/16; B29C 65/1629; B29C 65/1632; B29C 65/1635; B29C 65/1638; B29C 66/70; B29C 66/71; B29C 66/723
See application file for complete search history.

(56) References Cited

U.S. PATENT DOCUMENTS

2006/0278617 A1  12/2006  Anantharaman et al.
2019/0016883 A1*  1/2019  Yamanaka .......... B29C 66/9592
2021/0101347 A1  4/2021  Nishino et al.

FOREIGN PATENT DOCUMENTS

EP        4 159 791 A1    4/2023
JP        H08-509771 A    10/1996
(Continued)

OTHER PUBLICATIONS

International Search Report dated Feb. 7, 2023, issued in PCT/JP2023/001843, with English translation thereof.
(Continued)

*Primary Examiner* — Zachary M Davis
(74) *Attorney, Agent, or Firm* — GREENBLUM & BERNSTEIN, P.L.C.

(57) ABSTRACT

A formed article obtained by performing laser welding on a transmitting resin member and an absorbing resin member, includes: a bonded part where the transmitting resin member and the absorbing resin member are bonded to each other by the laser welding, in which a molten pool is observed at the bonded part in a cross section that includes a normal to the transmitting resin member or the absorbing resin member and is orthogonal to a scanning direction of a laser beam, an area of the molten pool is 0.210 mm² or more and 1.00 mm² or less, the transmitting resin member and the absorbing resin member are each molded from a resin composition, the resin composition contains a thermoplastic resin, the thermoplastic resin contains at least a polyamide-based resin
(Continued)

(A1), and a glass transition point temperature of the resin composition is 85° C. or higher.

15 Claims, 3 Drawing Sheets

(51) Int. Cl.
| | |
|---|---|
| *B32B 27/08* | (2006.01) |
| *B32B 27/20* | (2006.01) |
| *B32B 27/34* | (2006.01) |
| *C08K 3/016* | (2018.01) |
| *C08K 7/14* | (2006.01) |
| *C08L 77/00* | (2006.01) |
| *B29K 77/00* | (2006.01) |
| *B29K 105/16* | (2006.01) |

(52) U.S. Cl.
CPC .......... *B29C 66/7392* (2013.01); *B32B 27/08* (2013.01); *B32B 27/20* (2013.01); *B32B 27/34* (2013.01); *C08K 3/016* (2018.01); *C08K 7/14* (2013.01); *C08L 77/00* (2013.01); *B29K 2077/00* (2013.01); *B29K 2105/16* (2013.01); *B29K 2995/0016* (2013.01); *B29K 2995/0026* (2013.01); *B32B 2307/3065* (2013.01); *B32B 2307/412* (2013.01); *C08L 2205/025* (2013.01)

(56) References Cited

FOREIGN PATENT DOCUMENTS

| | | |
|---|---|---|
| JP | 2018-202861 A | 12/2018 |
| JP | 2019-006839 A | 1/2019 |
| JP | 2019-025673 A | 2/2019 |
| JP | 2020-163864 A | 10/2020 |
| JP | 2020-193333 A | 12/2020 |
| WO | 94/25530 A1 | 11/1994 |
| WO | 2007/029942 A1 | 3/2007 |
| WO | 2019/160117 A1 | 8/2019 |
| WO | 2021/241382 A1 | 12/2021 |

OTHER PUBLICATIONS

Written Opinion dated Feb. 7, 2023, issued in PCT/JP2023/001843, with English translation thereof.
Search Report issued Jul. 25, 2025 in European patent application No. 23786453.3.

* cited by examiner

FORMED ARTICLE, WELDING METHOD, AND METHOD OF MANUFACTURING FORMED ARTICLE

TECHNICAL FIELD

The present invention relates to a formed article, a welding method, and a method of manufacturing a formed article.

BACKGROUND ART

Polyamide resins, which are representative engineering plastics, are easy to process, and are excellent in mechanical properties, electrical properties, heat resistance, and other physical and chemical properties. Therefore, the polyamide resins are widely used in vehicle components, electrical and electronic device components, and other precision device components.

In recent years, even components with complex shapes are also being manufactured using polyamide resins. For example, in order to form a battery case of a lithium secondary battery into a sealed structure, various bonding techniques such as adhesives, vibration welding, ultrasonic welding, hot plate welding, injection welding, and laser welding techniques are used.

However, welding using an adhesive has problems of not only a time loss until curing but also an environmental burden such as contamination of surroundings.

In ultrasonic welding, hot plate welding, and the like, problems such as damage to products due to vibration and heat and the need for a post-treatment due to the generation of abrasion powder and burrs have been pointed out.

In addition, injection welding often requires special molds and molding machines, and furthermore, has a problem in that injection welding cannot be used for materials having low fluidity.

On the other hand, laser welding is a method in which a resin member (hereinafter, sometimes referred to as a "transmitting resin member") having a property of transmitting (also referred to as non-absorbing or weakly absorbing) laser light and a resin member (hereinafter, sometimes referred to as an "absorbing resin member") having a property of absorbing laser light are brought into contact and welded to each other and the two resin members are bonded to each other.

Specifically, laser welding is a method in which a bonding surface is irradiated with laser light from the transmitting resin member side such that the absorbing resin member forming the bonding surface is melted with the energy of the laser light and bonded. Laser welding does not generate abrasion powder or burrs and causes little damage to precision components and products such as a base in a housing, and a polyamide resin itself is a material having a relatively high laser transmittance. Therefore, processing a polyamide resin product by a laser welding technique has recently been attracting attention.

The transmitting resin member is usually obtained by molding a light-transmitting resin composition. As such a light-transmitting resin composition, laser welding strength in a resin composition formed of polyamide 66, polyamide 6I, glass fiber, and a flame retardant is disclosed in Examples of Patent Document 1. Patent Document 2 discloses laser welding strength in a resin composition formed of polyamide 66, glass fiber, and a flame retardant.

CITATION LIST

Patent Documents

[Patent Document 1]
Japanese Unexamined Patent Application, First Publication No. 2020-193333
[Patent Document 2]
Japanese Unexamined Patent Application, First Publication No. 2019-25673

SUMMARY OF INVENTION

Technical Problem

In recent years, laser welding processing has been on the rise, and there is a trend that high bonding strength is required from the viewpoint of securing product reliability and safety. The bonding strength of the examples disclosed in Patent Documents 1 and 2 is not sufficient in practical use, and a higher bonding strength is required. For the bonding strength, not only bonding strength but also a fracture mode is important. The fracture mode is preferably a base material fracture in which a resin composition being adhered is broken or resins around a bonded portion are torn off to include the bonded portion, rather than interfacial peeling in which peeling occurs at a bonded surface. The reason for this is that the bonded portion holds sufficient bonding strength in the base material fracture, which means that there is no defect in a bonding step and reliability of the bonded portion is high.

In addition, since a formed article manufactured by laser welding processing is required to have design properties in addition to bonding strength, appearance characteristics of a bonded portion are also required.

The present invention has been made in view of the above-described circumstances, and an object thereof is to provide a formed article that is excellent in bonding strength, reliability of a bonded portion, and appearance characteristics of a bonded point, a method of manufacturing a formed article, and a laser welding method.

Solution to Problem

The present inventors repeated intensive studies to achieve the above object, and as a result, found that the above problems can be solved by setting an area of a melted bonded part of a laser-welded part to be in a specific range.

The present invention includes the following aspects.
[1] A formed article obtained by performing laser welding on a transmitting resin member and an absorbing resin member, the formed article including: a bonded part where the transmitting resin member and the absorbing resin member are bonded to each other by the laser welding, in which a molten pool is observed at the bonded part in a cross section that includes a normal to the transmitting resin member or the absorbing resin member and is orthogonal to a scanning direction of a laser beam, an area of the molten pool is 0.210 mm$^2$ or more and 1.00 mm$^2$ or less, the transmitting resin member and the absorbing resin member are each molded from a resin composition, the resin composition contains a thermoplastic resin, the thermoplastic resin contains at least a polyamide-based resin (A1), and a glass transition point temperature of the resin composition is 85° C. or higher.
[2] The formed article according to [1], in which the resin composition contains a filler (B).
[3] The formed article according to [1] or [2], in which the resin composition has a crystallization peak temperature of 220° C. or lower.

[4] The formed article according to any one of [1] to [3], in which the transmitting resin member has a beam transmittance of 30% or more for a beam wavelength of 940 nm.

[5] The formed article according to any one of [1] to [4], in which the resin composition contains 0 parts by mass or more and 150 parts by mass or less of a filler (B) with respect to 100 parts by mass of the thermoplastic resin.

[6] The formed article according to any one of [2] to [5], in which the filler (B) is one or two or more of glass fiber, calcium carbonate, talc, mica, wollastonite, and milled fiber.

[7] The formed article according to any one of [1] to [6], in which the polyamide-based resin (A1) is a semi-aromatic polyamide (A1-2) having an aromatic ring in a skeleton, or an alloy of the semi-aromatic polyamide (A1-2) and an aliphatic polyamide (A1-1).

[8] The formed article according to [7], in which a content ratio of an isophthalic acid component to 100 mol % of a dicarboxylic acid component constituting the semi-aromatic polyamide (A1-2) is 10 mol % or more.

[9] The formed article according to any one of [1] to [8], in which the resin composition contains a flame retardant (C).

[10] The formed article according to [9], in which the flame retardant (C) is either or both of phosphinate and diphosphinate.

[11] The formed article according to [10], in which the phosphinate is a compound represented by General Formula (I), and the diphosphinate is a compound represented by General Formula (II),

[Chem 1]

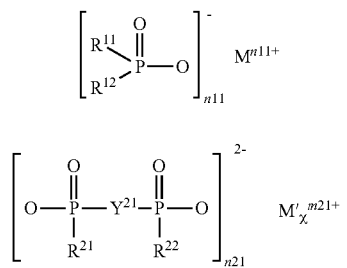

(in General Formula (I), $R^{11}$ and $R^{12}$ are each independently an alkyl group having 1 or more and 6 or less carbon atoms or an aryl group having 6 or more and 10 or less carbon atoms, $M^{n11+}$ is an n11-valent metal ion, M is an element belonging to Group 2 or Group 15 of a periodic table, a transition element, zinc, or aluminum, n11 is 2 or 3, and a plurality of $R^{11}$'s and $R^{12}$'s may be the same or different from each other in a case where n11 is 2 or 3, and in General Formula (II), $R^{21}$ and $R^{22}$ are each independently an alkyl group having 1 or more and 6 or less carbon atoms or an aryl group having 6 or more and 10 or less carbon atoms, $Y^{21}$ is an alkylene group having 1 or more and 10 or less carbon atoms or an arylene group having 6 or more and 10 or less carbon atoms, $M'^{m21+}_x$ is an m21-valent metal ion, M' is an element belonging to Group 2 or Group 15 of the periodic table, a transition element, zinc, or aluminum, n21 is an integer of 1 or more and 3 or less, a plurality of $R^{21}$'s, $R^{22}$'s, and $Y^{21}$'s may be the same or different from each other in a case where n21 is 2 or 3, m21 is 2 or 3, x is 1 or 2, a plurality of M"s may be the same or different from each other in a case where x is 2, and n21, x, and m21 are integers that satisfy a relational expression of $2 \times n21 = m21 \times x$).

[12] The formed article according to any one of [1] to [11], in which the formed article has a sealed structure bonded by laser welding.

[13] The formed article according to any one of [1] to [12], in which the formed article is used for a battery case of a lithium secondary battery, for a sensor case, for a camera case, for an image or video capturing component housing, for a magnet switch housing, for a breaker housing, for a connector, for a secondary battery housing, for a current sensor case, for a camera module housing, for a camera module, or for a lens barrel (lens tube).

[14] A welding method of performing laser welding on a transmitting resin member and an absorbing resin member, in which the transmitting resin member and the absorbing resin member are molded from a resin composition, and the resin composition contains a thermoplastic resin, the welding method including: performing laser welding on the transmitting resin member and the absorbing resin member to obtain a formed article in which an area of a molten pool observed at a portion joined by the laser welding in a cross section that includes a normal to the transmitting resin member or the absorbing resin member and is orthogonal to a scanning direction of a laser beam is 0.210 mm² or more and 1.00 mm² or less.

[15] A method of manufacturing a formed article, using the welding method according to [14].

Advantageous Effects of Invention

According to the present invention, it is possible to provide a formed article excellent in bonding strength, reliability of a bonded portion, and appearance characteristics of a bonded point, a method of manufacturing a formed article, and a laser welding method.

DESCRIPTION OF EMBODIMENTS

Hereinafter, an embodiment for implementing the present invention (hereinafter, simply referred to as "the present embodiment") will be described in detail. The following present embodiment is an example for describing the present invention, and is not intended to limit the present invention to the following contents. The present invention can be implemented with appropriate modifications made within the scope of the gist.

In the present specification, "polyamide" means a polymer having an amide (—NHCO—) group in a main chain.

<Formed Article>

The present embodiment provides a formed article in which a transmitting resin member and an absorbing resin member are laser-welded to each other.

The formed article of the present embodiment has a bonded part by laser welding.

In the present specification, the "bonded part" indicates a point where, when the transmitting resin member and the absorbing resin member are bonded to each other by the laser welding, the absorbing resin member melts, the transmitting resin member receives heat of a melted point and melts, such melted regions solidify while being in contact with each other, and the transmitting resin member and the absorbing resin member are bonded to each other.

In the formed article, the "bonded part" may be present at one point or at a plurality of points. By having the bonded part, for example, an effect of bonding components to form a composite, forming a sealed structure, or the like is expected.

A laser irradiation path is not particularly limited, and can be an open path with a start point and an end point separated from each other, for example, in a case of bonding components, or a closed path with an end point overlapping with any point (including a start point) on the path in a case where a formed article having a sealed structure is produced. A shape of the open path is not particularly limited, and may be a straight line, a curved line, or a combination thereof. A shape of the closed path is not particularly limited, and can be appropriately adjusted according to a shape of the formed article having the sealed structure.

In the formed article of the present embodiment, at least the transmitting resin member and the absorbing resin member may be bonded to each other, and the number of each of transmitting resin members and absorbing resin members to be bonded may be two or more.

The transmitting resin member is a member that transmits laser light.

The absorbing resin member is a member that absorbs the laser light, generates heat, and melts.

Figure 5:
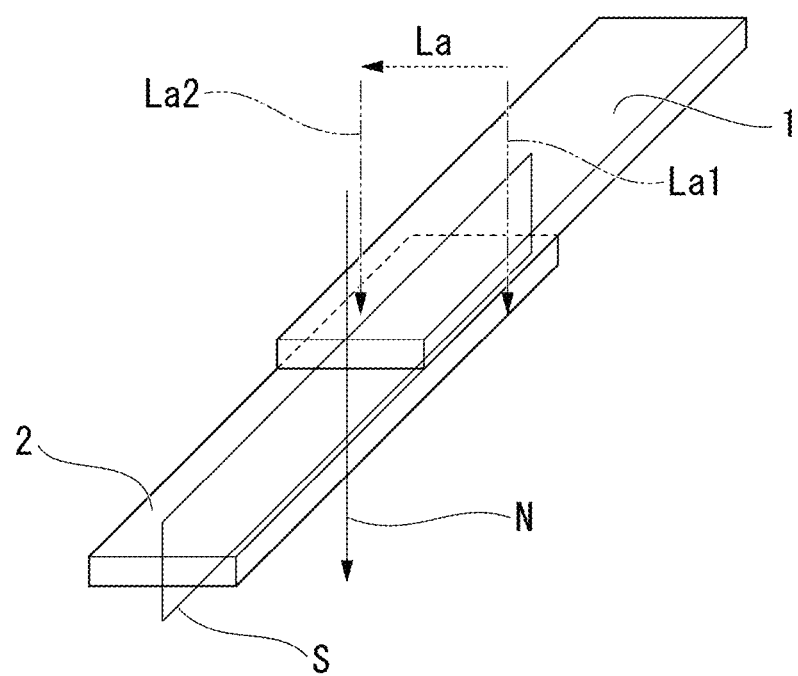
FIG. 5 is a schematic view for describing a method of acquiring a cross section of the formed article.

In the formed article of the present embodiment, a molten pool is observed at a bonded part in a cross section that includes a normal to the transmitting resin member or the absorbing resin member and is orthogonal to a scanning direction of a laser beam. As shown in FIG. 5, a normal N to a transmitting resin member 1 or an absorbing resin member 2 is defined. The normal N is a line perpendicular to a tangent plane. In a case where the transmitting resin member 1 or the absorbing resin member 2 is a curved surface, a line perpendicular to a tangent line to the curved surface is defined as the normal N.

In the present specification, an optical axis of the laser beam means an axis coinciding with a traveling direction of laser light.

In a flat head type in which a laser irradiation port itself moves, a moving direction of the laser irradiation port is defined as the scanning direction of the laser beam.

In a galvano type in which a laser is operated at an angle of a mirror installed in a fixed irradiation port, a traveling direction of a laser beam reflected by the mirror is defined as the scanning direction of the laser beam.

In FIG. 5, La1 and La2 are optical axes of the laser beam, and La is the scanning direction of the laser beam.

In the formed article of the present embodiment, a molten pool is observed in a cross section S that includes the normal N to the transmitting resin member or the absorbing resin member and is orthogonal to the scanning direction La of the laser beam. The molten pool means a region in which the absorbing resin member melts, the adjacent transmitting resin member also melts, and these are re-solidified.

Figure 1:
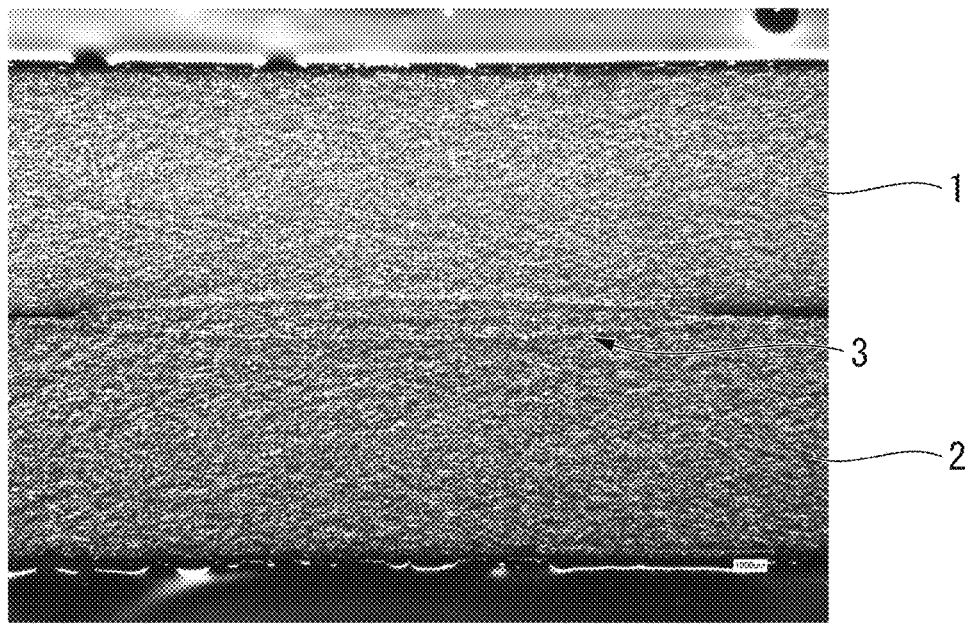
FIG. 1 is a cross-sectional photographic image of an example of a formed article of the present embodiment.

FIG. 1 shows an example of a cross section of the formed article of the present embodiment. FIG. 1 is an optical micrograph of a cross section including the bonded part of the formed article of the present embodiment, which is exposed to the cross section that includes the normal to the transmitting resin member or the absorbing resin member and is orthogonal to the scanning direction of the laser beam. An observation magnification is appropriately selected from a magnification at which the entire molten pool falls within a visual field. As an example, the magnification in FIG. 1 is 50-fold.

In the cross section of the formed article shown in FIG. 1, a molten pool 3 is observed between the transmitting resin member 1 and the absorbing resin member 2.

Figure 2:
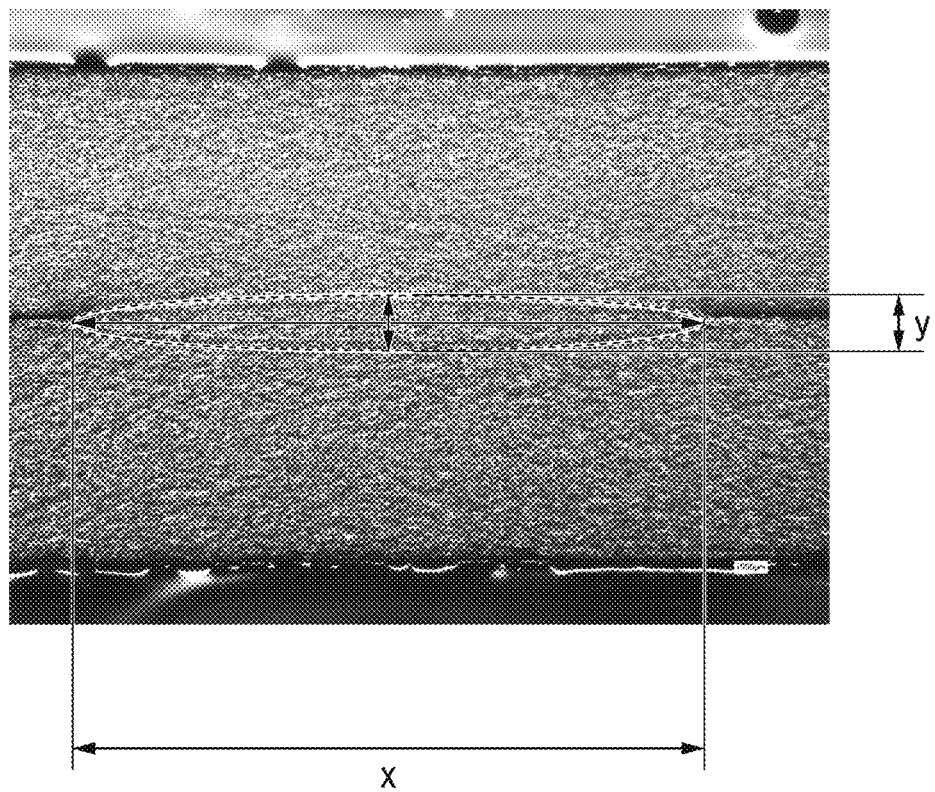
FIG. 2 is a cross-sectional photographic image of an example of the formed article of the present embodiment.

Similarly, FIG. 2 shows an example of the cross section of the formed article of the present embodiment. A width of the molten pool is a length x of a longest diameter, and a height of the molten pool is a maximum diameter y perpendicular to x.

An area of the molten pool is 0.21 nm$^2$ or more and 1.00 mm$^2$ or less, preferably 0.22 mm$^2$ or more and 0.85 mm$^2$ or less, and more preferably 0.23 nm$^2$ or more and 0.65 mm$^2$ or less.

When the area of the molten pool is equal to or more than the above lower limit, a bonding strength is improved. When the area of the molten pool is equal to or less than the above upper limit, a formed article having no processing marks on a surface of the formed article and having a good appearance can be obtained.

[Method of Measuring Area of Molten Pool]

Regarding the area of the molten pool of the formed article, after the cross section of the formed article is obtained by the following method, the area of the molten pool is calculated by the following method.

Method of Acquiring Cross Section

First, the formed article is cut to expose the cross section including the bonded part. In this case, the formed article is cut in a direction that includes the normal to the transmitting resin member or the absorbing resin member and is orthogonal to the scanning direction of the laser beam. The exposed cross section is observed with an optical microscope to obtain an optical microscope image. As the optical microscope, for example, VHX6000 manufactured by KEYENCE CORPORATION can be used.

Here, a magnification is set to 50-fold.

Method of Calculating Area of Molten Pool

The area of the molten pool can be measured by a function of calculating an area of a designated region of the device for the optical microscope image of the cross section of the formed article obtained by the above-described method. In the designation of the region for measuring the area of the molten pool, an outer circumferential portion of the molten pool is designated so that the outer circumferential portion passes through both ends of the length x of the largest diameter and both ends of the maximum diameter y perpendicular to x shown in FIG. 2. An example of the designation of the region is indicated by the broken line in FIG. 2.

In order to clearly observe the molten pool, a polishing work may be performed after the laser-welded part is cut with a band saw, a saw, or the like and before the observation is performed.

A method of the polishing work is not particularly limited, and it is suitable to use a rotary polishing device as the polishing method because an observation region can be uniformly polished.

In addition, in order to more clearly observe the molten pool, the observation part may be subjected to an etching treatment.

An etching method is not particularly limited, but chemical etching that damages an object is suitable.

For example, for polyamide, inorganic acids, particularly hydrochloric acid, sulfuric acid, and formic acid are suitable as etchants.

When the formed article of the present embodiment has the above-described configuration, the formed article can have bonding strength by laser welding and a good appearance.

In the formed article of the present embodiment, by setting a beam transmittance of the transmitting resin member for a beam wavelength of 940 nm to 30% or more, sufficient energy is transferred to the absorbing resin member, and efficient processing can be achieved.

A thickness of the transmitting resin member is not particularly limited as long as the beam transmittance for a beam wavelength of 940 nm is 30% or more, but the thickness is preferably 0.3 mm or more and 5 mm or less, more preferably 0.5 mm or more and 4 mm or less, still more preferably 0.7 mm or more and 3 mm or less, and most preferably 0.9 mm or more and 2 mm or less.

In a case where the thickness of the transmitting resin member is smaller than the above lower limit, when a load occurs at the bonded portion, the member itself is damaged. When the thickness is equal to or more than the above lower limit and is equal to or less than the upper limit, the beam transmittance is increased, and energy can be efficiently transferred to the absorbing resin member.

<Method of Measuring Beam Transmittance>

Regarding the beam transmittance of the transmitting resin member, the beam transmittance is measured by the following method after a formed article is obtained by the following method.

Acquisition of Transmitting Resin Member

As a method of acquiring the transmitting resin member, the transmitting resin member can be prepared by various processing methods such as injection molding, extrusion molding, and hot press molding. Particularly, injection molding has a small variation in composition inside the formed article and is suitable for preparing a reproducible test piece (transmitting resin member).

Method of Measuring Beam Transmittance

The beam transmittance of the transmitting resin member obtained by the above-described method can be measured using a spectrophotometer. For example, as the spectrophotometer, (V670) manufactured by JASCO Corporation can be combined with an integrating sphere "ILN-725" for the measurement. Since light transmitted by the resin is scattered, it is preferable to perform measurement of collecting the scattered light using the integrating sphere.

It is preferable that the formed article of the present embodiment has a sealed structure bonded by laser welding.

More specifically, as the formed article of the present embodiment, a housing of a lithium ion secondary battery, a current sensor, a camera module housing, a camera module, and a lens barrel (lens tube) are preferable.

Next, the resin composition forming the formed article of the present embodiment will be described below.

«Resin Composition»

Each of the transmitting resin member and the absorbing resin member is molded from a resin composition. The resin composition contains a thermoplastic resin.

[Thermoplastic Resin]

Examples of the thermoplastic resin include a polyamide-based resin, a polyester-based resin, a polyacetal-based resin, a polycarbonate-based resin, a polyacrylic-based resin, a polyphenylene ether-based resin (including modified polyphenylene ether modified by blending or graft polymerization of polyphenylene ether with another resin), a polyarylate-based resin, a polysulfone-based resin, a polyphenylene sulfide-based resin, a polyethersulfone-based resin, a polyketone-based resin, a polyphenylene ether ketone-based resin, a polyimide-based resin, a polyamide-imide-based resin, a polyetherimide-based resin, a polyurethane-based resin, a polyolefin-based resin (for example, α-olefin (co)polymer), and various ionomers.

The thermoplastic resin is preferably a crystalline resin having a melting point in a range of 100° C. or higher and 350° C. or lower, an amorphous resin having a glass transition temperature in a range of 50° C. or higher and 250° C. or lower, or a combination thereof.

The melting point of the crystalline resin mentioned here means the temperature refers to a peak top temperature of an endothermic peak that appears when a temperature is raised from 23° C. at a temperature rise rate of 10° C./min using a differential scanning calorimeter (DSC). In a case where two or more endothermic peaks appear, the melting point of the crystalline resin refers to the peak top temperature of the endothermic peak on the highest temperature side. An enthalpy of the endothermic peak at this time is desirably 10 J/g or more, and desirably 20 J/g or more. In addition, at the time of measurement, it is desirable to use a sample which is heated once to a temperature condition of the melting point+20° C. or higher to melt the resin and is then cooled to 23° C. at a temperature decrease rate of 10° C./min.

In addition, the glass transition temperature Tg of the amorphous resin mentioned here refers to a peak top temperature of a peak at which, when measurement is performed at an applied frequency of 8 Hz while raising the temperature from 23° C. at a temperature rise rate of 2° C./min using a dynamic viscoelasticity measuring device, a storage modulus significantly decreases and a loss modulus reaches its maximum. In a case where two or more peaks of the loss modulus appear, the glass transition temperature Tg of the amorphous resin refers to the peak top temperature of the peak on the highest temperature side. A frequency of the measurement at this time is set to at least one or more measurements every 20 seconds in order to improve accuracy of the measurement. In addition, a method of preparing a sample for the measurement is not particularly limited, but from the viewpoint of eliminating an influence of molding strain, it is desirable to use a cut-out piece of a hot press molded article. In addition, from the viewpoint of thermal conduction, it is desirable that a size (width and thickness) of the cut-out piece is as small as possible.

The thermoplastic resin may be a homopolymer or a copolymer.

As the thermoplastic resin, the above-mentioned resins may be used singly, or in a combination of two or more kinds thereof. In addition, as the thermoplastic resin, one obtained by modifying the above-mentioned resin with at least one compound selected from unsaturated carboxylic acid, an acid anhydride thereof, and a derivative thereof can also be used.

The thermoplastic resin is preferably, from the viewpoint of heat resistance, moldability, design properties, and mechanical properties, one or more resins selected from the group consisting of a polyolefin-based resin, a polyamide-based resin, a polyester-based resin, a polyacetal-based resin, a polyacrylic-based resin, a polyphenylene ether-based resin, and a polyphenylene sulfide-based resin.

In the present embodiment, the thermoplastic resin contains at least a polyamide-based resin (A1). Accordingly, bonding strength by the laser welding can be improved, and appearance of the bonded point can be improved. In addition, the polyamide-based resin (A1) may be used singly or in combination with another thermoplastic resin.

(Polyamide-Based Resin (A1))

The polyamide-based resin (A1) is preferably a semi-aromatic polyamide (A1-2) having an aromatic ring in a skeleton, or an alloy of an aliphatic polyamide (A1-1) and a semi-aromatic polyamide (A1-2). Accordingly, the bonding strength at the time of laser welding can be improved and the appearance of the bonded point can be improved. In a case where the polyamide-based resin (A1) is an alloy, the thermoplastic resin may be an alloy of three or more kinds in combination with another thermoplastic resin.

In the case where the polyamide-based resin (A1) is the alloy described above, a content of each of the aliphatic polyamide (A1-1) and the semi-aromatic polyamide (A1-2) in the polyamide-based resin (A1) is not particularly limited.

Particularly, the content of the semi-aromatic polyamide (A1-2) with respect to a total of 100.0 parts by mass of the aliphatic polyamide (A1-1) and the semi-aromatic polyamide (A1-2) is preferably 5.0 parts by mass or more and 100.0 parts by mass or less, more preferably 5.0 parts by mass or more and 95.0 parts by mass or less, and still more preferably 10.0 parts by mass or more and 80.0 parts by mass or less, even more preferably 15.0 parts by mass or more and 70.0 parts by mass or less.

In addition, the content of the aliphatic polyamide (A1-1) with respect to a total of 100.0 parts by mass of the aliphatic polyamide (A1-1) and the semi-aromatic polyamide (A1-2) is preferably 0.0 parts by mass or more and 95.0 parts by mass or less, more preferably 5.0 parts by mass or more and 95.0 parts by mass or less, still more re preferably 7.0 parts by mass or more and 80.0 parts by mass or less, and even more preferably 9.0 parts by mass or more and 70.0 parts by mass or less.

By setting the content of each of the aliphatic polyamide (A1-1) and the semi-aromatic polyamide (A1-2) with respect to a total of 100 parts by mass of the aliphatic polyamide (A1-1) and the semi-aromatic polyamide (A1-2) to be in the above-described numerical range, the bonding strength at the time of laser welding can be improved, and the appearance of the bonded point can be improved.

(1) Aliphatic Polyamide (A1-1)

It is preferable that constitutional units of the aliphatic polyamide (A1-1) satisfy at least one of the following conditions (1) and (2).

(1) Contain an aliphatic dicarboxylic acid unit (A1-1a) and an aliphatic diamine unit (A1-1b).

(2) Contain at least one constitutional unit (A1-1c) selected from the group consisting of a lactam unit and an aminocarboxylic acid unit.

The constitutional units of the aliphatic polyamide (A1-1) can contain one or two or more kinds of polyamides that satisfy at least any one of the conditions (1) and (2). Particularly, the constitutional units of the aliphatic polyamide (A1-1) preferably satisfy the condition (1).

(1-1) Aliphatic Dicarboxylic Acid Unit (A1-1a)

Examples of an aliphatic dicarboxylic acid constituting the aliphatic dicarboxylic acid unit (A1-1a) include a linear or branched saturated aliphatic dicarboxylic acid having 3 or more and 20 or less carbon atoms.

Examples of the linear saturated aliphatic dicarboxylic acid having 3 or more and 20 or less carbon atoms include, but are not limited to, malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of the branched saturated aliphatic dicarboxylic acid having 3 or more and 20 or less carbon atoms include, but are not limited to, dimethylmalonic acid, 2,2-dimethylsuccinic acid, 2,3-dimethylglutaric acid, 2,2-diethylsuccinic acid, 2,3-diethylglutaric acid, 2,2-dimethylglutaric acid, 2-methyladipic acid, and trimethyladipic acid.

These aliphatic dicarboxylic acids constituting the aliphatic dicarboxylic acid unit (A1-1a) may be used singly or in combination of two or more kinds thereof.

Particularly, a linear saturated aliphatic dicarboxylic acid having 6 or more carbon atoms tends to provide superior heat resistance, fluidity, toughness, low water absorption, rigidity, and the like of the resin composition and is thus preferable as the aliphatic dicarboxylic acid constituting the aliphatic dicarboxylic acid unit (A1-1a).

Specific examples of the preferable linear saturated aliphatic dicarboxylic acid having 6 or more carbon atoms include adipic acid, sebacic acid, dodecanedioic acid, tetradecanedioic acid, hexadecanedioic acid, octadecanedioic acid, and eicosanedioic acid.

Particularly, the linear saturated aliphatic dicarboxylic acid having 6 or more carbon atoms is preferably adipic acid, sebacic acid, or dodecanedioic acid from the viewpoint of the heat resistance of the resin composition and the like.

In addition, the aliphatic polyamide (A1-1) may further contain a unit derived from a trivalent or higher polyvalent carboxylic acid, as necessary, within a range in which the effects of the formed article of the present embodiment are not impaired. Examples of the trivalent or higher polyvalent carboxylic acid include trimellitic acid, trimesic acid, and pyromellitic acid. These trivalent or higher polyvalent carboxylic acids may be used singly or in combination of two or more kinds thereof.

(1-2) Aliphatic Diamine Unit (A1-1b)

Examples of an aliphatic diamine constituting the aliphatic diamine unit (A1-1b) include a linear saturated aliphatic diamine having 2 or more and 20 or less carbon atoms, or a branched saturated aliphatic diamine having 3 or more and 20 or less carbon atoms.

Examples of the linear saturated aliphatic diamine having 2 or more and 20 or less carbon atoms include, but are not limited to, ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine.

Examples of the branched saturated aliphatic diamine having 3 or more and 20 or less carbon atoms include, but are not limited to, 2-methylpentamethylenediamine (also called 2-methyl-1,5-diaminopentane), 2,2,4-trimethylhexamethylenediamine, 2,4,4-trimethylhexamethylenediamine, 2-methyl-1,8-octanediamine (also called 2-methyloctamethylenediamine), and 2,4-dimethyloctamethylenediamine.

These aliphatic diamines constituting the aliphatic diamine unit (A1-1b) may be used singly or in combination of two or more kinds thereof.

Particularly, the number of carbon atoms in the aliphatic diamine constituting the aliphatic diamine unit (A1-1b) is preferably 6 or more and 12 or less, and more preferably 6 or more and 10 or less. By setting the number of carbon atoms in the aliphatic diamine constituting the aliphatic diamine unit (A1-1b) to be equal to or more than the above lower limit, the heat resistance of the formed article is further improved. On the other hand, by setting the number of carbon atoms to be equal to or less than the above upper limit, crystallinity and mold release properties of the formed article are further improved.

Specific examples of the preferable linear or branched saturated aliphatic diamine having 6 or more and 12 or less carbon atoms include hexamethylenediamine, 2-methylpentamethylenediamine, and 2-methyl-1,8-octanediamine.

Particularly, the linear or branched saturated aliphatic diamine having 6 or more and 12 or less carbon atoms is preferably hexamethylenediamine or 2-methylpentamethylenediamine. By including the aliphatic diamine unit (A1-1b), the heat resistance, rigidity, and the like of the formed article are further improved.

In addition, the aliphatic polyamide (A1-1) may further contain a unit derived from a trivalent or higher polyvalent aliphatic amine, as necessary, within a range in which the effects of the formed article of the present embodiment are not impaired. Examples of the trivalent or higher polyvalent aliphatic amine include bishexamethylenetriamine.

(1-3) At Least One Constitutional Unit (A1-1c) Selected from Group Consisting of Lactam Unit and Aminocarboxylic Acid Unit The aliphatic polyamide (A1-1) can contain at least one constitutional unit (A1-1c) selected from the group consisting of a lactam unit and an aminocarboxylic acid unit. By including such a unit, polyamides with excellent toughness tend to be obtained.

Here, "lactam unit" and "aminocarboxylic acid unit" mentioned here refer to polymerized (polycondensed) lactam and aminocarboxylic acid.

Examples of a lactam constituting the lactam unit include, but are not limited to, butyrolactam, pivalolactam, ε-caprolactam, caprylolactam, enantholactam, undecanolactam, and laurolactam (dodecanolactam).

Particularly, the lactam constituting the lactam unit is preferably ε-caprolactam or laurolactam, and is more preferably ε-caprolactam. By including such a lactam, the toughness of the formed article tends to be further improved.

Examples of an aminocarboxylic acid constituting the aminocarboxylic acid unit include, but are not limited to, ε-aninocarboxylic acid and α,ω-amino acid, which are compounds in which a lactam ring is opened.

As the aminocarboxylic acid constituting the aminocarboxylic acid unit, a linear or branched saturated aliphatic carboxylic acid having 4 or more and 14 or less carbon atoms, in which an ω-position is substituted with an amino group, is preferable. Examples of such an aminocarboxylic acid include, but are not limited to, 6-aminocaproic acid, 11-aminoundecanoic acid, and 12-aminododecanoic acid. Examples of the aminocarboxylic acid further include para-aminomethylbenzoic acid.

The lactam and the aminocarboxylic acid constituting the constitutional unit (A1-1c) may be used singly or in combination of two or more kinds thereof.

As an index of a molecular weight of the aliphatic polyamide (A1-1), a weight-average molecular weight can be used. The weight-average molecular weight of the aliphatic polyamide is preferably 10,000 or more and 50,000 or less, more preferably 17,000 or more and 45,000 or less, still more preferably 20,000 or more and 45,000 or less, even still more preferably 25,000 or more and 45,000 or less, particularly preferably 30,000 or more and 45,000 or less, and most preferably 35,000 or more and 40,000 or less.

By setting the weight-average molecular weight to be in the above-described numerical range, the bonding strength at the time of laser welding can be improved, and the appearance of the bonded point can be improved.

The weight-average molecular weight of the aliphatic polyamide (A1-1) can be measured using, for example, gel permeation chromatography (GPC).

(2) Semi-Aromatic Polyamide (A1-2)

The semi-aromatic polyamide (A1-2) is a polyamide having an aromatic ring in a skeleton, and is a polyamide containing a diamine unit and a dicarboxylic acid unit.

The semi-aromatic polyamide (A1-2) contains, with respect to all the constitutional units of the semi-aromatic polyamide (A1-2), preferably 10 mol % or more and 95 mol % or less of an aromatic constitutional unit, more preferably 20 mol % or more and 90 mol % or less of an aromatic constitutional unit, and still more preferably 30 mol % or more and 85 mol % or less of an aromatic constitutional unit. Here, "aromatic constitutional unit" mentioned here means an aromatic diamine unit and an aromatic dicarboxylic acid unit.

Furthermore, the semi-aromatic polyamide (A1-2) contains, with respect to 100 mol % of all dicarboxylic acid units of the semi-aromatic polyamide (A1-2), preferably 10 mol % or more of the aromatic dicarboxylic acid unit, more preferably 30 mol % or more of the aromatic dicarboxylic acid unit, still more preferably 50 mol % or more of the aromatic dicarboxylic acid unit, and particularly preferably 70 mol % or more of the aromatic dicarboxylic acid unit.

By setting the content of the aromatic dicarboxylic acid unit to be equal to or more than the above lower limit, the bonding strength at the time of laser welding can be improved, and the appearance of the bonded point can be improved.

The aromatic dicarboxylic acid unit in the semi-aromatic polyamide (A1-2) is not particularly limited, but a terephthalic acid unit or an isophthalic acid unit is preferable, and an isophthalic acid unit is more preferable.

Proportions of predetermined monomer units constituting the semi-aromatic polyamide (A1-2) can be measured by nuclear magnetic resonance spectroscopy ($^1$H-NMR) or the like.

Specifically, for example, the semi-aromatic polyamide (A1-2) is heated and dissolved in heavy hexafluoroisopropanol at a proportion which gives a concentration of about 5 mass %, the resultant is subjected to $^1$H-NMR analysis using Nuclear Magnetic Resonance Spectrometer JNM ECA-500 manufactured by JEOL Ltd, and integral ratios are calculated to calculate each of a unit having an aromatic dicarboxylic acid constituting the semi-aromatic polyamide (A1-2), a unit having a dicarboxylic acid other than the aromatic dicarboxylic acid, a unit having an aromatic diamine, and a unit having an amine other than the aromatic diamine.

(2-1) Dicarboxylic Acid Unit (A1-2a)

A dicarboxylic acid unit (A1-2a) is not particularly limited, and examples thereof include an aromatic dicarboxylic acid unit, an aliphatic dicarboxylic acid unit, and an alicyclic dicarboxylic acid unit.

(2-2-1) Aromatic Dicarboxylic Acid (D)

Examples of an aromatic dicarboxylic acid constituting the aromatic dicarboxylic acid unit other than an isophthalic acid unit include, but are not limited to, a dicarboxylic acid having an aromatic group such as a phenyl group and a naphthyl group. The aromatic group of the aromatic dicarboxylic acid may be unsubstituted or may have a substituent.

The substituent is not particularly limited, but examples thereof include an alkyl group having 1 or more and 4 or less carbon atoms, an aryl group having 6 or more and 10 or less carbon atoms, an arylalkyl group having 7 or more and 10 or less carbon atoms, an alkylaryl group having 7 or more and 10 or less carbon atoms, a halogen group, a silyl group having 1 or more and 6 or less carbon atoms, and a sulfonic acid group and a salt thereof (such as a sodium salt).

Examples of the alkyl group having 1 or more and 4 or less carbon atoms include, but are not limited to, a methyl group, an ethyl group, an n-propyl group, an isopropyl group, an n-butyl group, an isobutyl group, and a tert-butyl group.

Examples of the aryl group having 6 or more and 10 or less carbon atoms include, but are not limited to, a phenyl group and a naphthyl group.

Examples of the arylalkyl group having 7 or more and 10 or less carbon atoms include, but are not limited to, a benzyl group.

Examples of the alkylaryl group having 7 or more and 10 or less carbon atoms include, but are not limited to, a tolyl group and a xylyl group.

Examples of the halogen group include, but are not limited to, a fluoro group, a chloro group, a bromo group, and an iodo group.

Examples of the silyl group having 1 or more and 6 or less carbon atoms include, but are not limited to, a trimethylsilyl group and a tert-butyldimethylsilyl group.

Particularly, the aromatic dicarboxylic acid constituting the aromatic dicarboxylic acid unit other than the isophthalic acid unit is preferably an aromatic dicarboxylic acid having 8 or more and 20 or less carbon atoms, which is unsubstituted or substituted with a predetermined substituent.

Specific examples of the aromatic dicarboxylic acid having 8 or more and 20 or less carbon atoms, which is unsubstituted or substituted with a predetermined substituent, include, but are not limited to, terephthalic acid, naphthalenedicarboxylic acid, 2-chloroterephthalic acid, 2-methylterephthalic acid, 5-methylisophthalic acid, and 5-sodiosulfoisophthalic acid.

The aromatic dicarboxylic acid constituting the aromatic dicarboxylic acid unit may be used singly or in combination of two or more kinds thereof.

(2-1-2) Aliphatic Dicarboxylic Acid Unit

Examples of an aliphatic dicarboxylic acid constituting the aliphatic dicarboxylic acid unit include a linear or branched saturated aliphatic dicarboxylic acid having 3 or more and 20 or less carbon atoms.

Examples of the linear saturated aliphatic dicarboxylic acid having 3 or more and 20 or less carbon atoms include, but are not limited to, malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of the branched saturated aliphatic dicarboxylic acid having 3 or more and 20 or less carbon atoms include, but are not limited to, dimethylmalonic acid, 2,2-dimethylsuccinic acid, 2,3-dimethylglutaric acid, 2,2-diethylsuccinic acid, 2,3-diethylglutaric acid, 2,2-dimethylglutaric acid, 2-methyladipic acid, and trimethyladipic acid.

(2-1-3) Alicyclic Dicarboxylic Acid Unit

Examples of an alicyclic dicarboxylic acid constituting the alicyclic dicarboxylic acid unit (hereinafter, sometimes referred to as an "alicyclic type dicarboxylic acid unit") include, but are not limited to, an alicyclic dicarboxylic acid having an alicyclic structure and having 3 or more and 10 or less carbon atoms. Particularly, the alicyclic dicarboxylic acid is preferably an alicyclic dicarboxylic acid having an alicyclic structure and having 5 or more and 10 or less carbon atoms.

Examples of such an alicyclic dicarboxylic acid include, but are not limited to, 1,4-cyclohexanedicarboxylic acid, 1,3-cyclohexanedicarboxylic acid, and 1,3-cyclopentanedicarboxylic acid. Particularly, the alicyclic dicarboxylic acid is preferably 1,4-cyclohexanedicarboxylic acid.

The alicyclic dicarboxylic acid constituting the alicyclic dicarboxylic acid unit may be used singly or in combination of two or more kinds thereof.

An alicyclic group of the alicyclic dicarboxylic acid may be unsubstituted or may have a substituent. Examples of the substituent include an alkyl group having 1 or more and 4 or less carbon atoms. Examples of the alkyl group having 1 or more and 4 or less carbon atoms include the same alkyl groups as those exemplified in the section of "aromatic dicarboxylic acid unit".

The dicarboxylic acid unit other than the isophthalic acid unit preferably contains an aromatic dicarboxylic acid unit and more preferably contains an aromatic dicarboxylic acid having 6 or more carbon atoms.

By using such a dicarboxylic acid, a resin composition having superior mechanical properties tends to be obtained. In addition, the bonding strength at the time of laser welding can be improved, and the appearance of the bonded point can be improved.

In the semi-aromatic polyamide (A1-2), the dicarboxylic acid constituting the dicarboxylic acid unit (A1-2a) is not limited to the compounds described as the dicarboxylic acid, and may also be a compound equivalent to the dicarboxylic acid.

Here, the "compound equivalent to the dicarboxylic acid" means a compound capable of forming the same dicarboxylic acid structure as the dicarboxylic acid structure derived from the dicarboxylic acid described above. Examples of such a compound include, but are not limited to, anhydrides of a dicarboxylic acid and halides of a dicarboxylic acid.

In addition, the semi-aromatic polyamide (A1-2) may further contain a unit derived from a trivalent or higher polyvalent carboxylic acid, as necessary, within a range in which the effects of the formed article of the present embodiment are not impaired. Examples of the trivalent or higher polyvalent carboxylic acid include trimellitic acid, trimesic acid, and pyromellitic acid. These trivalent or higher polyvalent carboxylic acids may be used singly or in combination of two or more kinds thereof.

(2-2) Diamine Unit (A1-2b)

A diamine unit (A1-2b) constituting the semi-aromatic polyamide (A1-2) is not particularly limited, and examples thereof include an aromatic diamine unit, an aliphatic diamine unit, and an alicyclic diamine unit. Particularly, the diamine unit (A1-2b) constituting the semi-aromatic polyamide (A1-2) contains preferably a diamine unit having 4 or more and 10 or less carbon atoms, and more preferably a diamine unit having 6 or more and 10 or less carbon atoms.

(2-2-1) Aliphatic Diamine Unit

Examples of an aliphatic diamine constituting the aliphatic diamine unit include a linear saturated aliphatic diamine having 4 or more and 20 or less carbon atoms.

Examples of the linear saturated aliphatic diamine having 4 or more and 20 or less carbon atoms include, but are not limited to, ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine.

(2-2-2) Alicyclic Diamine Unit

Examples of an alicyclic diamine (hereinafter, sometimes referred to as "alicyclic type diamine") constituting the alicyclic diamine unit include, but are not limited to, 1,4-cyclohexanediamine, 1,3-cyclohexanediamine, and 1,3-cyclopentanediamine.

(2-2-3) Aromatic Diamine Unit

An aromatic diamine constituting the aromatic diamine unit is not limited to the following as long as the aromatic diamine is a diamine containing an aromatic group. Specific examples of the aromatic diamine include meta-xylylenediamine.

These diamines constituting each of diamine units may be used singly or in combination of two or more kinds thereof.

Particularly, the diamine unit (A1-2b) is preferably an aliphatic diamine unit, more preferably a linear saturated aliphatic diamine unit having 4 or more and 10 or less carbon atoms, and still more preferably a linear saturated aliphatic diamine unit having 6 or more and 10 or less carbon atoms, and particularly preferably a hexamethylenediamine unit.

By using such a diamine, a resin composition having superior mechanical properties tends to be obtained. In addition, the bonding strength at the time of laser welding can be improved, and the appearance of the bonded point can be improved.

As an index of a molecular weight of the semi-aromatic polyamide (A1-2), a weight-average molecular weight can be used. The weight-average molecular weight of the semi-aromatic polyamide is preferably 10,000 or more and 50,000 or less, more preferably 15,000 or more and 45,000 or less, still more preferably 15,000 or more and 40,000 or less, even still more preferably 17,000 or more and 35,000 or less, particularly preferably 17,000 or more and 30,000 or less, and most preferably 18,000 or more and 28,000 or less.

By setting the weight-average molecular weight to be in the above-described numerical range, the bonding strength at the time of laser welding can be improved, and the appearance of the bonded point can be improved. The weight-average molecular weight of the semi-aromatic polyamide (A1-2) can be measured using, for example, GPC.

(3) Terminating Agent

An end of the polyamide-based resin (A1) may be terminated with a known terminating agent.

Such a terminating agent can be added from the dicarboxylic acid and the diamine, or from at least one selected from the group consisting of the lactam and the aminocarboxylic acid, as a molecular weight adjuster, when a polyamide is manufactured.

Examples of the terminating agent include, but are not limited to, monocarboxylic acid, a monoamine, an acid anhydride (phthalic anhydride or the like), a monoisocyanate, a monoester, and a monoalcohol. The terminating agent may be used singly or in combination of two or more kinds thereof.

Particularly, the terminating agent is preferably a monocarboxylic acid or a monoamine. By terminating the end of the polyamide with the terminating agent, thermal stability of the formed article tends to be further improved.

The monocarboxylic acid that can be used as the terminating agent may be any monocarboxylic acid having reactivity with an amino group that may be present at the end of the polyamide. Examples of the monocarboxylic acid include, but are not limited to, an aliphatic monocarboxylic acid, an alicyclic monocarboxylic acid, and an aromatic monocarboxylic acid.

Examples of the aliphatic monocarboxylic acid include formic acid, acetic acid, propionic acid, butyric acid, valeric acid, caproic acid, caprylic acid, lauric acid, tridecylic acid, myristic acid, palmitic acid, stearic acid, pivalic acid, and isobutyric acid.

Examples of the alicyclic monocarboxylic acid include cyclohexanecarboxylic acid and the like.

Examples of the aromatic monocarboxylic acid include benzoic acid, toluic acid, α-naphthalenecarboxylic acid, β-naphthalenecarboxylic acid, methylnaphthalenecarboxylic acid, and phenylacetic acid.

These monocarboxylic acids may be used singly or in combination of two or more kinds thereof.

In particular, the end of the semi-aromatic polyamide (A1-2) is preferably terminated with acetic acid from the viewpoint of fluidity and mechanical strength.

The monoamine that can be used as the terminating agent may be any monoamine having reactivity with a carboxy group that may be present at the end of the polyamide. Examples of the monoamine include, but are not limited to, an aliphatic monoamine, an alicyclic monoamine, and an aromatic monoamine.

Examples of the aliphatic monoamine include methylamine, ethylamine, propylamine, butylamine, hexylamine, octylamine, decylamine, stearylamine, dimethylamine, diethylamine, dipropylamine, and dibutylamine.

Examples of the alicyclic monoamine include cyclohexylamine and dicyclohexylamine.

Examples of the aromatic monoamine include aniline, toluidine, diphenylamine, and naphthylamine.

These monoamines may be used singly or in combination of two or more kinds thereof.

A resin composition containing a polyamide in which an end is terminated with the terminating agent tends to have superior heat resistance, fluidity, toughness, low water absorption, and rigidity.

(4) Preferable Polyamide-Based Resin (A1)

A preferable polyamide-based resin (A1) is not particularly limited, but examples thereof include polyamides obtained by a polycondensation reaction of lactams, such as polyamide 6, polyamide 11, and polyamide 12; and polyamides obtained as copolymers of diamines and dicarboxylic acids, such as polyamide 6,6, polyamide 6,10, and polyamide 6,11, polyamide 6,12, polyamide 6,6/6,I, polyamide 6,T, polyamide 6,I, polyamide 6,I/6,T, polyamide 9,T, polyamide 10,T, polyamide 2M5,T, polyamide MXD,6, polyamide 6,C, and polyamide 2M5,C.

Particularly, one or more aliphatic polyamides selected from the group consisting of polyamide 6, polyamide 11, polyamide 12, polyamide 6,6, polyamide 6,10, polyamide 6,11, and polyamide 6,12, or one or more semi-aromatic polyamides selected from the group consisting of polyamide 6,6/6,I, polyamide 6,T, polyamide 6,I, polyamide 6,I/6,T, polyamide 9,T, and polyamide MXD,6 are more preferable.

(Method of Manufacturing Polyamide-Based Resin (A1))

When the polyamide-based resin (A1) (the aliphatic polyamide (A1-1) and the semi-aromatic polyamide (al-2)) is manufactured, the amount of the dicarboxylic acid added and the amount of the diamine added are preferably set to be in about the same molar amount. Considering the molar amount of diamine that escapes from a reaction system during the polymerization reaction, the total molar amount of diamine with respect to a molar amount of 1 of the entire dicarboxylic acid is preferably 0.9 or more and 1.2 or less, more preferably 0.95 or more and 1.1 or less, and still more preferably 0.98 or more and 1.05 or less.

Examples of the method of manufacturing a polyamide include, but are not limited to, the following polymerization step (1) or (2).

(1) Step of polymerizing a combination of a dicarboxylic acid constituting the dicarboxylic acid unit and a diamine constituting the diamine unit to obtain a polymer.

(2) Step of polymerizing one or more selected from the group consisting of a lactam constituting the lactam unit and an aminocarboxylic acid constituting the aminocarboxylic acid unit to obtain a polymer.

In addition, it is preferable that the method of manufacturing a polyamide further includes an increasing step of increasing a degree of polymerization of the polyamide after the polymerization step. In addition, as necessary, after the polymerization step and the increasing step, a terminating step of terminating an end of the obtained polymer with a terminating agent may be included.

Specific examples of the method of manufacturing a polyamide include various methods exemplified in the following 1) to 4).

1) Method of heating an aqueous solution or a water suspension of one or more selected from the group consisting of a dicarboxylic acid-diamine salt, a mixture of a dicarboxylic acid and a diamine, a lactam, and an aminocarboxylic acid, and polymerizing the resultant in a state in which a molten state is maintained (hereinafter, sometimes referred to as "hot melt polymerization method").

2) Method of increasing the degree of polymerization of a polyamide obtained by a hot melt polymerization method while maintaining a solid state at a temperature equal to or lower than a melting point (hereinafter, sometimes referred to as "hot melt polymerization/solid state polymerization method").

3) Method of polymerizing one or more selected from the group consisting of a dicarboxylic acid-diamine salt, a mixture of a dicarboxylic acid and a diamine, a lactam, and an aminocarboxylic acid while maintaining a solid state (hereinafter, sometimes referred to as "solid state polymerization method").

4) Method of performing polymerization using a dicarboxylic acid halide component equivalent to a dicarboxylic acid and a diamine component (hereinafter, sometimes referred to as "solution method").

Particularly, as a specific method of manufacturing a polyamide, a manufacturing method including a hot melt polymerization method is preferable. In addition, in a case of manufacturing a polyamide by the hot melt polymerization method, it is preferable to hold a molten state until the polymerization is completed. In order to hold the molten state, it is necessary to carry out the manufacturing under polymerization conditions suitable for a polyamide composition. Examples of the polymerization conditions include the following conditions. First, a polymerization pressure in the hot melt polymerization method is controlled to 14 kg/cm$^2$ or more and 25 kg/cm$^2$ or less (gauge pressure), and heating is continued. Next, a pressure in a tank is lowered while being applied for 30 minutes or more until the pressure in the tank reaches an atmospheric pressure (0 kg/cm$^2$ by gauge pressure).

In the method of manufacturing a polyamide, a form of polymerization is not particularly limited, and may be a batch type or a continuous type.

A polymerization apparatus used for manufacturing the polyamide is not particularly limited, and a known apparatus can be used. Specific examples of the polymerization apparatus include an autoclave type reactor, a tumbler type reactor, and an extruder type reactor (such as a kneader).

Hereinafter, as the method of manufacturing a polyamide, a method of manufacturing a polyamide by a batch type hot melt polymerization method will be specifically shown, but the method of manufacturing a polyamide is not limited thereto.

First, an aqueous solution containing about 40 mass % or more and 60 mass % or less of raw material components of a polyamide (a combination of a dicarboxylic acid and a diamine, and as necessary, at least one selected from the group consisting of a lactam and an aminocarboxylic acid) is prepared. Next, the aqueous solution is concentrated in a concentrating tank operated at a temperature of 110° C. or higher and 180° C. or lower and a pressure of about 0.035 MPa or more and 0.6 MPa or less (gauge pressure) to about 65 mass % or more and 90 mass % or less to obtain a concentrated solution.

Next, the obtained concentrated solution is transferred to the autoclave and heating is continued until a pressure in the autoclave reaches about 1.2 MPa or more and 2.2 MPa or less (gauge pressure).

Next, in the autoclave, the pressure is maintained at about 1.2 MPa or more and 2.2 MPa or less (gauge pressure) while removing at least one of water and a gas component. Next, when the temperature reaches about 220° C. or higher and 260° C. or lower, the pressure is lowered to the atmospheric pressure (0 MPa by gauge pressure). By lowering the pressure in the autoclave to the atmospheric pressure and then lowering the pressure as necessary, water as a by-product can be effectively removed.

Next, the autoclave is pressurized with an inert gas such as nitrogen, and the molten polyamide is extruded from the autoclave as a strand. The extruded strand is cooled and cut to obtain polyamide pellets.

[Filler (B)]

It is preferable that the resin composition further contains a filler (B) in addition to the above-mentioned thermoplastic resin. By including the filler (B), it is possible to obtain a resin composition having superior mechanical properties such as toughness and rigidity.

The filler (B) is not particularly limited, and examples thereof include glass fiber, carbon fiber, calcium silicate fiber, potassium titanate fiber, aluminum borate fiber, glass flake, calcium carbonate, talc, kaolin, mica, hydrotalcite, zinc carbonate, calcium monohydrogen phosphate, wollastonite, zeolite, boehmite, magnesium oxide, calcium silicate, sodium aluminosilicate, magnesium silicate, Ketjen black, acetylene black, furnace black, carbon nanotubes, graphite, brass, copper, silver, aluminum, nickel, iron, calcium fluoride, montmorillonite, swelling fluoromica, apatite, and milled fiber.

These fillers (B) may be used singly or in combination of two or more kinds thereof.

Particularly, from the viewpoint of rigidity, strength, and the like, the filler (B) is preferably glass fiber, carbon fiber, glass flakes, talc, kaolin, mica, calcium monohydrogen phosphate, wollastonite, carbon nanotubes, graphite, calcium fluoride, montmorillonite, swelling fluoromica, or apatite.

In addition, the filler (B) is more preferably one or more selected from the group consisting of glass fiber, calcium carbonate, talc, mica, wollastonite, and milled fiber, still more preferably glass fiber or carbon fiber, and particularly preferably glass fiber.

In a case where the filler (B) is glass fiber or carbon fiber, a number-average fiber diameter (dl) of the filler (B) is preferably 3 am or more and 30 μm or less. In addition, a weight-average fiber length (L) of the filler (B) is preferably 100 μm or more and 5 mm or less. Furthermore, an aspect ratio ((L)/(dl)) of the number-average fiber diameter (D1) to the weight-average fiber length (L) is preferably 10 or more and 100 or less. By using the glass fiber or carbon fiber having the above-described configuration, better properties can be exhibited.

In addition, in a case where the filler (B) is glass fiber, the number-average fiber diameter (dl) is more preferably 3 μm or more and 30 μm or less. The weight-average fiber length (L) is more preferably 103 μm or more and 5 mm or less. Furthermore, the aspect ratio ((L)/(dl)) is more preferably 3 or more and 100 or less.

The number-average fiber diameter and the weight-average fiber length of the filler (B) can be measured using the following methods.

First, the formed article is dissolved in a solvent in which the thermoplastic resin (A) is soluble, such as formic acid. Next, for example, 100 or more pieces of the filler (B) are randomly selected from the obtained insoluble components.

Next, the number-average fiber diameter can be obtained by observing the filler (B) with an optical microscope, a scanning electron microscope, or the like, and dividing the sum of measured fiber diameters by the number of measured pieces of the filler (B). Alternatively, the weight-average fiber length can be obtained by dividing the sum of measured fiber lengths by a total weight of the measured pieces of the filler (B).

The resin composition contains, with respect to 100 parts by mass of the thermoplastic resin (A), preferably 0.0 parts by mass or more and 150.0 parts by mass or less of the filler (B), more preferably 10.0 parts by mass or more and 140.0 parts by mass or less of the filler (B), still more preferably 20.0 parts by mass or more and 135.0 parts by mass or less of the filler (B), particularly preferably 25.0 parts by mass or more and 130.0 parts by mass or less of the filler (B), and most preferably 30.0 parts by mass or more and 100 parts by mass or less of the filler (B).

By setting a content of the filler (B) to be equal to or more than the above lower limit, mechanical properties such as strength and rigidity of the formed article tend to be further improved. On the other hand, by setting the content of the filler (B) to be equal to or less than the above upper limit, a formed article having superior surface appearance and superior laser welding strength tends to be obtained.

In particular, in a case where the filler (B) is glass fiber and the content of the filler (B) is set to be in the above-described range with respect to 100 parts by mass of the thermoplastic resin (A), the mechanical properties such as the strength, rigidity, and the like of the formed article tend to be further improved.

[Flame Retardant (C)]

It is preferable that the resin composition further contains a flame retardant (C) in addition to the above-mentioned thermoplastic resin.

The flame retardant (C) is not particularly limited, and examples thereof include a halogen-based flame retardant containing a halogen element, such as a chlorine-based flame retardant and a bromine-based flame retardant, and a phosphorus-based flame retardant not containing a halogen element.

These flame retardants (C) may be used singly, or in a combination of two or more kinds thereof. In addition, flame retardancy can be further improved by using the flame retardant (C) in combination with a flame retardant aid.

As the halogen-based flame retardant, from the viewpoint of suppressing the amount of corrosive gas generated during melt processing such as extrusion or molding, and further, from the viewpoint of mechanical properties such as expression of flame retardancy, toughness, and rigidity, brominated polyphenylene ethers (including poly(di)bromophenylene ether and the like) or brominated polystyrene (including polydibromostyrene, polytribromostyrene, cross-linked brominated polystyrene, and the like) are preferable, and brominated polystyrene is more preferable.

A bromine content in the brominated polystyrene is preferably 5 mass % or more and 75 mass % or less with respect to a total mass of the brominated polystyrene. By setting the bromine content to be equal to or more than the above lower limit, it is possible to satisfy the amount of bromine required for flame retardancy with a smaller blending amount of brominated polystyrene, and it is possible to obtain a formed article having excellent heat resistance, fluidity, toughness, low water absorption, and rigidity and having superior flame retardancy without impairing properties of a polyamide copolymer. In addition, by setting the bromine content to be equal to or less than the above upper limit, thermal decomposition is more unlikely to occur during melt processing such as extrusion or molding, and gas generation and the like can be further suppressed, so that it is possible to obtain a formed article having superior heat discoloration resistance.

The phosphorus-based flame retardant is not particularly limited as long as the phosphorus-based flame retardant is a flame retardant containing a phosphorus element without containing a halogen element. Examples of the phosphorus-based flame retardant include a phosphate ester-based flame retardant, a melamine polyphosphate-based flame retardant, a phosphazene-based flame retardant, a phosphinic acid-based flame retardant, and a red phosphorus-based flame retardant.

Particularly, the flame retardant (C) is preferably a phosphate ester-based flame retardant, a melamine polyphosphate-based flame retardant, a phosphazene-based flame retardant, or a phosphinic acid-based flame retardant, and particularly preferably a phosphinic acid-based flame retardant.

Specific examples of the phosphinic acid-based flame retardant include phosphinate and diphosphinate.

Examples of the phosphinate include a compound represented by General Formula (T) (hereinafter, sometimes abbreviated as "phosphinate (T)").

Examples of the diphosphinate include a diphosphinate represented by General Formula (11) (hereinafter, sometimes abbreviated as "diphosphinate (TI)").

[Chem 2]

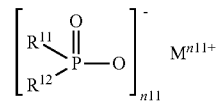

(I)

-continued

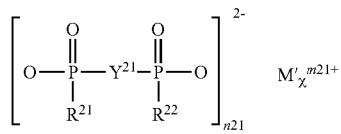
(II)

(in General Formula (1), $R^{11}$ and $R^{12}$ are each independently an alkyl group having 1 or more and 6 or less carbon atoms or an aryl group having 6 or more and 10 or less carbon atoms, $M''^{11+}$ is an n11-valent metal ion, M is an element belonging to Group 2 or Group 15 of a periodic table, a transition element, zinc, or aluminum, n11 is 2 or 3, and a plurality of $R^{11}$'s and $R^{12}$'s may be the same or different from each other in a case where n11 is 2 or 3, and in General Formula (2), $R^{21}$ and $R^{22}$ are each independently an alkyl group having 1 or more and 6 or less carbon atoms or an aryl group having 6 or more and 10 or less carbon atoms, $Y^{21}$ is an alkylene group having 1 or more and 10 or less carbon atoms or an arylene group having 6 or more and 10 or less carbon atoms, $M'''^{21+}$ is an m21-valent metal ion, M' is an element belonging to Group 2 or Group 15 of the periodic table, a transition element, zinc, or aluminum, n21 is an integer of 1 or more and 3 or less, a plurality of $R^{21}$'s, $R^{22}$'s, and $Y^{21}$'s may be the same or different from each other in a case where n21 is 2 or 3, m21 is 2 or 3, x is 1 or 2, a plurality of M''s may be the same or different from each other in a case where x is 2, and n21, x, and m21 are integers that satisfy a relational expression of 2×n21=m21×x).

($R^{11}$, $R^{12}$, $R^{21}$, and $R^{22}$)

$R^{11}$, $R^{12}$, $R^{21}$, and $R^{22}$ are each independently an alkyl group having 1 or more and 6 or less carbon atoms or an aryl group having 6 or more and 10 or less carbon atoms. In a case where n11 is 2 or 3, a plurality of $R^{11}$'s and $R^{12}$'s may be the same or different from each other, but are preferably the same as each other from the viewpoint of easy manufacturing. In a case where n21 is 2 or 3, a plurality of $R^{21}$'s and $R^{22}$'s may be the same or different from each other, but are preferably the same as each other from the viewpoint of easy manufacturing.

The alkyl group may be chain-like or cyclic, but is preferably chain-like. The chain-like alkyl group may be linear or may be branched. Examples of the linear alkyl group a methyl group, an ethyl group, an n-propyl group, an n-butyl group, an n-pentyl group, and an n-hexyl group. Examples of the branched alkyl group include a 1-methylethyl group, a 1-methylpropyl group, a 2-methylpropyl group, a 1,1-dimethylethyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, an 1-ethylbutyl group, a 2-ethylbutyl group, and a 1,1,2-trimethylpropyl group.

Examples of the aryl group include a phenyl group and a naphthyl group.

The alkyl group and the aryl group may have a substituent. Examples of the substituent in the alkyl group include an aryl group having 6 or more and 10 or less carbon atoms. Examples of the substituent in the aryl group include an alkyl group having 1 or more and 6 or less carbon atoms.

Specific examples of the alkyl group having a substituent include a benzyl group.

Specific examples of the aryl group having a substituent include a tolyl group and a xylyl group.

Particularly, $R^{11}$, $R^{12}$, $R^{11}$, and $R^{22}$ are preferably an alkyl group having 1 or more and 6 or less carbon atoms, and more preferably a methyl group or an ethyl group.

($Y^{21}$)

$Y^{21}$ is an alkylene group having 1 or more and 10 or less carbon atoms or an arylene group having 6 or more and 10 or less carbon atoms. In a case where n21 is 2 or 3, a plurality of $Y^{21}$'s may be the same or different from each other, but are preferably the same as each other from the viewpoint of easy manufacturing.

The alkylene group may be chain-like or cyclic, but is preferably chain-like. The chain-like alkylene group may be linear or branched. Examples of the linear alkylene group include a methylene group, an ethylene group, a trimethylene group, tetramethylene, a pentamethylene group, and a hexamethylene group. Examples of the branched alkylene group include a 1-methylethylene group and a 1-methylpropylene group.

Examples of the arylene group include a phenylene group and a naphthylene group.

The alkylene group and the arylene group may have a substituent. Examples of the substituent in the alkylene group include an aryl group having 6 or more and 10 or less carbon atoms. Examples of the substituent in the arylene group include an alkyl group having 1 or more and 6 or less carbon atoms.

Specific examples of the alkylene group having a substituent include a phenylmethylene group, a phenylethylene group, a phenyltrimethylene group, and a phenyltetramethylene group.

Specific examples of the arylene group having a substituent include a methylphenylene group, an ethylphenylene group, a tert-butylphenylene group, a methylnaphthylene group, an ethylnaphthylene group, and a tert-butylnaphthylene group. Particularly, $Y^{21}$ is preferably an alkylene group having 1 or more and 10 or less carbon atoms, and more preferably a methylene group or an ethylene group.

(M and M')

M and M' are each independently an ion of an element belonging to Group 2 or Group 15 of the periodic table, an ion of a transition element, a zinc ion, or an aluminum ion. Examples of the ion of the element belonging to Group 2 of the periodic table include a calcium ion and a magnesium ion. Examples of the ion of the element belonging to Group 15 of the periodic table include a bismuth ion.

In a case where x is 2, a plurality of M''s may be the same or different from each other, but are preferably the same as each other from the viewpoint of easy manufacturing.

Particularly, M and M' are preferably calcium, zinc, or aluminum, and more preferably calcium or aluminum.

(x)

x represents the number of M''s, and is 1 or 2. x can be appropriately selected according to the kind of M' and the number of diphosphinic acids.

(n11 and n21)

n11 represents the number of phosphinic acids and a valence of M, and is 2 or 3. n11 can be appropriately selected depending on a kind and a valence of M. n21 represents the number of diphosphinic acids and is an integer of 1 or more and 3 or less. n21 can be appropriately selected depending on a kind of M' and the number of M''s.

(m21)

m21 represents a valence of M' and is 2 or 3.

n21, x, and m21 are integers that satisfy a relational expression of 2×n21=m21×x.

Specific examples of a preferable phosphinate (1) include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methanedi(methylphosphinate), magnesium methanedi(methylphosphinate), aluminum methanedi(methylphosphinate), zinc methanedi(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate. Particularly, the phosphinate (I) is particularly preferably calcium dimethylphosphinate or aluminum dimethylphosphinate from the viewpoint of excellent flame retardancy.

Specific examples of a preferable diphosphinate (11) include calcium methanedi(methylphosphinate), magnesium methanedi(methylphosphinate), aluminum methanedi(methylphosphinate), zinc methanedi(methylphosphinate), calcium benzene-1,4-di(methylphosphinate), magnesium benzene-1,4-di(methylphosphinate), aluminum benzene-1,4-di(methylphosphinate), and zinc benzene-1,4-di(methylphosphinate).

A content of the flame retardant (C) is, with respect to 100 parts by mass of the thermoplastic resin, preferably 5.0 parts by mass or more and 90.0 parts by mass or less, more preferably 10.0 parts by mass or more and 80.0 parts by mass or less, still more preferably 15.0 parts by mass or more and 70.0 parts by mass or less, and particularly preferably 20.0 parts by mass or more and 60.0 parts by mass or less.

By setting the content of the phosphorus-based flame retardant to be equal to or more than the above lower limit, it is possible to obtain a resin composition having superior flame retardancy. On the other hand, by setting the amount of the phosphorus-based flame retardant to be equal to or less than the upper limit, it is possible to obtain a resin composition having superior flame retardancy without impairing the properties of the resin composition.

[Colorant (D)]

The resin composition can further contain a colorant (D) in addition to the thermoplastic resin.

As the colorant (D), colorants generally used can be blended, whereby the resin composition can be colored to any color tone from black to light.

In a case where the colorant (D) is used, there are two kinds of roles. The first role is to absorb a laser and melt the resin by generating heat. A colorant (D1) for absorbing the laser is added to the resin composition forming a resin on a side where the laser is absorbed, that is, the absorbing resin member.

The other role is to transmit the laser such that desired coloring is achieved and a beam passes to the resin on the side where the laser is absorbed. A colorant (D2) that transmits the laser is added to the resin composition for forming a resin on a side where the laser is transmitted, that is, the transmitting resin member.

As the colorant (D1) for absorbing the laser in the laser welding, either an inorganic material or an organic material can be used as long as the colorant absorbs the laser. Examples of such a colorant include carbon black (acetylene black, lamp black, thermal black, furnace black, channel black, Ketjen black, gas black, oil black, and the like), graphite, titanium black, and black iron oxide. Particularly, carbon black (D1-1) is preferable from the viewpoint of dispersibility, a color developing property, cost, and the like. These colorants can be used singly or in combination of two or more kinds thereof.

Examples of a non-black pigment include various inorganic pigments and organic pigments described below. These non-black pigments can be used singly or in combination of two or more kinds thereof.

Examples of the inorganic pigment include a white pigment such as calcium carbonate, titanium dioxide, zinc oxide, and zinc sulfide, a yellow pigment such as cadmium yellow, chrome yellow, titanium yellow, zinc chromate, yellow ochre, and yellow iron oxide, a red pigment such as a vermilion pigment, umber, red iron oxide, and cadmium red, a blue pigment such as Prussian blue, ultramarine, and cobalt blue, and a green pigment such as chromium green.

In addition, examples of the organic pigment include pigments based on azo, azomethine, methine, indanthrone, anthraquinone, pyranthrone, flavanthrone, benzanthrone, phthalocyanine, quinophthalone, perylene, perinone, dioxazine, thioindigo, isoindolinone, isoindoline, pyrrolopyrrole, and quinacridone.

As the colorant (D2), any organic substance that transmits the laser in the laser welding can be used. Examples of such a colorant include eBIND ACW-9871 (hereinafter, simply referred to as ACW) manufactured by Orient Chemical Industries Co., Ltd.

A content of the colorant (D1) is, with respect to 100 parts by mass of the thermoplastic resin, preferably 0.001 parts by mass or more and 5.00 parts by mass or less, more preferably 0.005 parts by mass or more and 2.5 parts by mass or less, and still more preferably 0.01 parts by mass or more and 1.00 parts by mass or less. By setting the content of the colorant (D1) to be equal to or more than the above lower limit, a heating efficiency by the laser can be further improved, the influence on thermal deterioration of the resin can be suppressed, and melting can be achieved within a short period of time. In addition, by setting the content of the colorant (D1) to be equal to or less than the above upper limit, carbonization of the resin due to heating can be more effectively prevented.

A content of the colorant (D2) is, with respect to 100 parts by mass of the thermoplastic resin, preferably 0.001 parts by mass or more and 5.00 parts by mass or less, more preferably 0.005 parts by mass or more and 2.5 parts by mass or less, and still more preferably 0.01 parts by mass or more and 1.00 parts by mass or less. By setting the content of the colorant (D2) to be equal to or more than the above lower limit, it is possible to develop a desired color by coloring. In addition, by setting the content of the colorant (D2) to be equal to or less than the upper limit, interruption of transmission of the laser is suppressed, and energy is efficiently transferred to the material on the absorption side, so that thermal deterioration of the resin on the transmission side can be effectively prevented.

[Other Additives (E)]

In addition to the above-described thermoplastic resin, the resin composition may also contain other additives (E) commonly used in resin compositions within a range in which the effects of the formed article of the present embodiment are not impaired. Examples of the other additives (E) include a moldability improving agent, a deterioration inhibitor, a nucleating agent, and a heat stabilizer.

A content of the other additive (E) in the resin composition varies depending on kinds thereof, the application of the composition, and the like, and is thus not particularly limited as long as the content of the other additive (E) is within a range in which the effects of the formed article of the present embodiment are not impaired.

(Moldability Improving Agent)

The moldability improving agent is not particularly limited, and examples thereof include a higher fatty acid, a higher fatty acid metal salt, a higher fatty acid ester, and a higher fatty acid amide. The moldability improving agent is also used as a "lubricating material".

(1) Higher Fatty Acid

Examples of the higher fatty acid include a linear or branched, saturated or unsaturated aliphatic monocarboxylic acid having 8 or more and 40 or less carbon atoms.

Examples of the linear saturated aliphatic monocarboxylic acid having 8 or more and 40 or less carbon atoms include lauric acid, palmitic acid, stearic acid, behenic acid, and montanic acid.

Examples of the branched saturated aliphatic monocarboxylic acid having 8 or more and 40 or less carbon atoms include isopalmitic acid and isostearic acid. Examples of the linear unsaturated aliphatic monocarboxylic acid having 8 or more and 40 or less carbon atoms include oleic acid and erucic acid.

Examples of the branched unsaturated aliphatic monocarboxylic acid having 8 or more and 40 or less carbon atoms include isooleic acid.

Particularly, the higher fatty acid is preferably stearic acid or montanic acid.

(2) Higher Fatty Acid Metal Salt

A higher fatty acid metal salt is a metal salt of a higher fatty acid.

Examples of a metal element of the metal salt include Group 1 elements, Group 2 elements, and Group 3 elements of the periodic table, zinc, and aluminum.

Examples of the Group 1 elements of the periodic table include sodium and potassium.

Examples of the Group 2 elements of the periodic table include calcium and magnesium.

Examples of the Group 3 elements of the periodic table include scandium and yttrium.

Particularly, the elements of groups 1 and 2 of the periodic table, or aluminum is preferable, and sodium, potassium, calcium, magnesium, or aluminum is more preferable.

Specific examples of the higher fatty acid metal salt include calcium stearate, aluminum stearate, zinc stearate, magnesium stearate, calcium montanate, sodium montanate, and calcium palmitate.

Particularly, the higher fatty acid metal salt is preferably a metal salt of montanic acid, or a metal salt of stearic acid.

(3) Higher Fatty Acid Ester

The higher fatty acid ester is an esterification product of a higher fatty acid and an alcohol.

The higher fatty acid ester is preferably an ester of an aliphatic carboxylic acid having 8 or more and 40 or less carbon atoms and an aliphatic alcohol having 8 or more and 40 or less carbon atoms.

Examples of the aliphatic alcohol having 8 or more and 40 or less carbon atoms include stearyl alcohol, behenyl alcohol, and lauryl alcohol.

Specific examples of the higher fatty acid ester include stearyl stearate and behenyl behenate.

(4) Higher Fatty Acid Amide

The higher fatty acid amide is an amide compound of a higher fatty acid.

Examples of the higher fatty acid amide include stearic acid amide, oleic acid amide, erucic acid amide, ethylene bis-stearyl amide, ethylene bis-oleyl amide, N-stearyl stearic acid amide, and N-stearyl erucic acid amide.

These higher fatty acids, higher fatty acid metal salts, higher fatty acid esters, and higher fatty acid amides may be used singly or in combination of two or more kinds thereof.

(Deterioration Inhibitor)

The deterioration inhibitor is used for the purpose of preventing thermal deterioration and discoloration under heat, and improving thermal aging resistance.

The deterioration inhibitor is not particularly limited, but examples thereof include a copper compound, a phenol-based stabilizer, a phosphite-based stabilizer, a hindered amine-based stabilizer, a triazine-based stabilizer, a benzotriazole-based stabilizer, a benzophenone-based stabilizer, a cyanoacrylate-based stabilizer, a salicylate-based stabilizer, and a sulfur-based stabilizer.

Examples of the copper compound include copper acetate and copper iodide.

Examples of the phenol-based stabilizer include a hindered phenol compound.

These deterioration inhibitors may be used singly or in combination of two or more kinds thereof.

(Nucleating Agent)

The nucleating agent means a substance by which at least one of the following effects (1) to (3) is obtained when the substance is added.

(1) Effect of increasing a crystallization peak temperature of the resin composition.
(2) Effect of reducing a difference between an extrapolation start temperature and an extrapolation end temperature of crystallization peaks.
(3) Effect of refining spherulites of the obtained formed article or of uniformizing sizes thereof.

Examples of the nucleating agent include, but are not limited to, talc, boron nitride, mica, kaolin, silicon nitride, carbon black, potassium titanate, and molybdenum disulfide.

The nucleating agents may be used singly, or in combination of two or more kinds thereof.

Particularly, the nucleating agent is preferably talc or boron nitride from the viewpoint of a nucleating agent effect.

In addition, since the effect of the nucleating agent is high, a number-average particle diameter of the nucleating agent is preferably 0.01 μm or more and 10 μm or less.

The number-average particle diameter of the nucleating agent can be measured using the following method. First, the formed article is dissolved in a solvent in which the resin composition is soluble, such as formic acid. Next, for example, 100 or more pieces of the nucleating agent are randomly selected from the obtained insoluble components. Next, the number-average particle diameter of the nucleating agent can be obtained by observing the nucleating agent with an optical microscope, a scanning electron microscope, or the like and measuring the particle diameters.

A content of the nucleating agent in the resin composition is, with respect to 100 parts by mass of the thermoplastic resin, preferably 0.001 parts by mass or more and 1 part by mass or less, more preferably 0.001 parts by mass or more and 0.5 parts by mass or less, and still more preferably 0.001 parts by mass or more and 0.09 parts by mass or less.

By setting the content of the nucleating agent to be equal to or more than the above lower limit, the heat resistance of the formed article tends to be further improved, and by setting the content of the nucleating agent to be equal to or less than the above upper limit, it is possible to obtain a formed article having superior toughness.

(Heat Stabilizer)

Examples of the heat stabilizer include, but are not limited to, a phenol-based heat stabilizer, a phosphorus-based heat stabilizer, an amine-based heat stabilizer, and metal salts of elements of groups 3, 4, and 11 to 14 of the periodic table.

(1) Phenol-Based Heat Stabilizer

Examples of the phenol-based heat stabilizer include, but are not limited to, a hindered phenol compound. The hindered phenol compound has a property of imparting excellent heat resistance and light resistance to resins such as polyamides and fibers.

Examples of the hindered phenol compound include, but are not limited to, N,N'-hexane-1,6-diylbis[3-(3,5-di-tert-butyl-4-hydroxyphenylpropionamide)], pentaerythrityl-tetrakis[3-(3,5-di-tert-butyl-4-hydroxyphenyl) propionate], N,N'-hexamethylenebis(3,5-di-tert-butyl-4-hydroxy-hydrocinnamamide), triethylene glycol-bis[3-(3-tert-butyl-5-methyl-4-hydroxyphenyl)propionate], 3,9-bis{2-[3-(3-tert-butyl-4-hydroxy-5-methylphenyl)propynyloxy]-1,1-dimethylethyl}-2,4,8,10-tetraoxaspiro[5,5]undecane, 3,5-di-tert-butyl-4-hydroxybenzylphosphonate-diethyl ester, 1,3,5-trimethyl-2,4,6-tris(3,5-di-tert-butyl-4-hydroxybenzyl)benzene, and 1,3,5-tris(4-tert-butyl-3-hydroxy-2,6-dimethylbenzyl)isocyanuric acid.

These hindered phenol compounds may be used singly or in combination of two or more kinds thereof.

In a case where the phenol-based heat stabilizer is used, a content of the phenol-based heat stabilizer in the resin composition is, with respect to a total mass of the resin composition, preferably 0.01 mass % or more and 1 mass % or less, and more preferably 0.05 mass % or more and 1 mass % or less.

By setting the content of the phenol-based heat stabilizer to be in the above range, the thermal aging resistance of the formed article can be further improved, and the amount of generated gas can be further reduced.

(2) Phosphorus-based Heat Stabilizer

Examples of the phosphorus-based heat stabilizer include, but are not limited to, a pentaerythritol type phosphite compound, trioctyl phosphite, trilauryl phosphite, tridecyl phosphite, octyl diphenyl phosphite, trisisodecyl phosphite, diisodecyl phenyl phosphite, di(tridecyl)phenyl phosphite, isooctyl diphenyl phosphite, isodecyl diphenyl phosphite, diphenyl(tridecyl)phosphite, triphenyl phosphite, tris(nonylphenyl) phosphite, tris(2,4-di-tert-butylphenyl) phosphite, tris(2,4-di-tert-butyl-5-methylphenyl)phosphite, tris(butoxyethyl)phosphite, 4,4'-butylidene-bis(3-methyl-6-tert-butylphenyl-tetra-tridecyl)diphosphite, tetra(C12-15 alkyl)-4,4'-isopropylidene diphenyl diphosphite, 4,4'-isopropylidene bis(2-tert-butylphenyl)-di(nonylphenyl) phosphite, tris(biphenyl) phosphite, tetra(tridecyl)-1,1,3-tris(2-methyl-5-tert-butyl-4-hydroxyphenyl)butane diphosphite, tetra(tridecyl)-4,4'-butylidenebis(3-methyl-6-tert-butylphenyl)diphosphite, tetra(C1-15 alkyl)-4,4'-isopropylidene diphenyl diphosphite, tris(mono/di-nonylphenyl) phosphite, 4,4'-isopropylidene bis(2-tert-butylphenyl)-di(nonylphenyl) phosphite, 9,10-dihydro-9-oxa-10-phosphaphenanthrene-10-oxide, tris(3,5-di-tert-butyl-4-hydroxyphenyl) phosphite, hydrogenated-4,4'-isopropylidene diphenyl polyphosphite, bis(octylphenyl)-bis(4,4'-butylidenebis(3-methyl-6-tert-butylphenyl))-1,6-hexanol diphosphite, hexatridecyl-1,1,3-tris(2-methyl-4-hydroxy-5-tert-butylphenyl)diphosphite, tris(4,4'-isopropylidene bis(2-tert-butylphenyl))phosphite, tris(1,3-stearoyloxyisopropyl)phosphite, 2,2-methylenebis(4,6-di-tert-butylphenyl)octyl phosphite, 2,2-methylenebis(3-methyl-4,6-di-tert-butylphenyl) 2-ethylhexyl phosphite, tetrakis(2,4-di-tert-butyl-5-methylphenyl)-4,4'-biphenylene diphosphite, and tetrakis(2,4-di-tert-butylphenyl)-4,4'-biphenylene diphosphite.

These phosphorus-based heat stabilizers may be used singly or in combination of two or more kinds thereof.

Examples of the pentaerythritol type phosphite compound include, but are not limited to, 2,6-di-tert-butyl-4-methylphenyl-phenyl-pentaerythritol diphosphite, 2,6-di-tert-butyl-4-methylphenyl-1-methyl-pentaerythritol diphosphite, 2,6-di-tert-butyl-4-methylphenyl-2-ethylhexyl-pentaerythritol diphosphite, 2,6-di-tert-butyl-4-methylphenyl-isodecyl-pentaerythritol diphosphite, 2,6-di-tert-butyl-4-methylphenyl-lauryl-pentaerythritol diphosphite, 2,6-di-tert-butyl-4-methylphenyl-isotridecyl-pentaerythritol diphosphite, 2,6-di-tert-butyl-4-methylphenyl-stearyl pentaerythritol diphosphite, 2,6-di-tert-butyl-4-methylphenyl cyclohexyl pentaerythritol diphosphite, 2,6-di-tert-butyl-4-methylphenyl-benzyl-pentaerythritol diphosphite, 2,6-di-tert-butyl-4-methylphenyl ethyl cellosolve-pentaerythritol diphosphite, 2,6-di-tert-butyl-4-methylphenyl butyl carbitol-pentaerythritol diphosphite, 2,6-di-tert-butyl-4-methylphenyl-octylphenyl-pentaerythritol diphosphite, 2,6-di-tert-butyl-4-methylphenyl-nonylphenyl pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, 2,6-di-tert-butyl-4-methylphenyl-2,6-di-tert-butylphenyl-pentaerythritol diphosphite, 2,6-di-tert-butyl-4-methylphenyl-2,4-di-tert-butylphenyl-pentaerythritol diphosphite, 2,6-di-tert-butyl-4-methylphenyl-2,4-di-tert-octylphenyl-pentaerythritol diphosphite, 2,6-di-tert-butyl-4-methylphenyl-2-cyclohexylphenyl-pentaerythritol diphosphite, 2,6-di-tert-amyl-4-methylphenyl-phenyl pentaerythritol diphosphite, bis(2,6-di-tert-amyl-4-methylphenyl)pentaerythritol diphosphite, and bis(2,6-di-tert-octyl-4-methylphenyl)pentaerythritol diphosphite.

These pentaerythritol type phosphite compounds may be used singly or in combination of two or more kinds thereof.

In a case where the phosphorus-based heat stabilizer is used, a content of the phosphorus-based heat stabilizer in the resin composition is, with respect to the total mass of the resin composition, preferably 0.01 mass % or more and 1 mass % or less, and more preferably 0.05 mass % or more and 1 mass % or less.

By setting the content of the phosphorus-based heat stabilizer to be in the above range, the thermal aging resistance of the formed article can be further improved, and the amount of generated gas can be further reduced.

(3) Amine-Based Heat Stabilizer

Examples of the amine-based heat stabilizer include, but are not limited to, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-tert-butyl-4-hydroxyphenyl)propionyloxy}butyl]-4-[3-(3,5-di-tert-butyl-4-hydroxyphenyl)propionyloxy]2,2,6,6-tetramethylpiperidine, a condensate of 1,2,3,4-butanetetracarboxylic acid, 1,2,2,6,6-pentamethyl-4-piperidinol, and β,β, β',β'-tetramethyl-3,9-[2,4,8,10-tetraoxaspiro(5,5)undecane]diethanol.

These amine-based heat stabilizers may be used singly, or in combination of two or more kinds thereof.

In a case where the amine-based heat stabilizer is used, a content of the amine-based heat stabilizer in the resin composition is, with respect to the total mass of the resin composition, preferably 0.01 mass % or more and 1 mass % or less, and more preferably 0.05 mass % or more and 1 mass % or less.

By setting the content of the amine-based heat stabilizer to be in the above range, the thermal aging resistance of the formed article can be further improved, and the amount of generated gas can be further reduced.

(4) Metal Salts of Elements of Groups 3, 4, and 11 to 14 of Periodic Table

The metal salts of the elements of groups 3, 4, and 11 to 14 of the periodic table are not limited as long as the metal salts are salts of metals belonging to these groups.

Particularly, from the viewpoint of further improving the thermal aging resistance of the formed article, a copper salt is preferable. Examples of such a copper salt include, but are not limited to, copper acetate, copper propionate, copper benzoate, copper adipate, copper terephthalate, copper isophthalate, copper salicylate, copper nicotinate, copper stearate, and a copper complex in which copper is coordinated to a chelating agent.

Examples of the chelating agent include ethylenediamine and ethylenediaminetetraacetic acid.

These copper salts may be used singly, or in combination of two or more kinds thereof.

Particularly, the copper salt is preferably copper acetate. In a case where copper acetate is used, a resin composition that has superior thermal aging resistance and can more effectively suppress metal corrosion of a screw or a cylinder portion during extrusion (hereinafter, sometimes simply referred to as "metal corrosion") is obtained.

In a case where the copper salt is used as the heat stabilizer, a content of the copper salt in the resin composition is, with respect to 100 parts by mass of the thermoplastic resin (A), preferably 0.01 parts by mass or more and 0.60 parts by mass or less, and more preferably 0.02 parts by mass or more and 0.40 parts by mass or less.

By setting the content of the copper salt to be in the above range, it is possible to further improve the thermal aging resistance of the formed article and to more effectively suppress the precipitation of copper and the metal corrosion.

In addition, from the viewpoint of improving the thermal aging resistance of the formed article, a content concentration of a copper element derived from the copper salt is, with respect to $10^6$ parts by mass (1,000,000 parts by mass) of the thermoplastic resin (A), preferably 10 parts by mass or more and 2,000 parts by mass or less, more preferably 30 parts by mass or more and 1,500 parts by mass or less, and still more preferably 50 parts by mass or more and 500 parts by mass or less.

The components of the heat stabilizer described above may be used singly or in combination of two or more kinds thereof.

[Method of Manufacturing Resin Composition]

A method of manufacturing the resin composition is not particularly limited as long as the method of manufacturing the resin composition is a method of mixing the components of the thermoplastic resin, the polyamide (A1), and as necessary, the filler (B), the flame retardant (C), the colorant (D), and the other additives (E). Hereinafter, the polyamide (A1), the filler (B), the flame retardant (C), the colorant (D), and the other additives (E) are respectively referred to as a component (A1), a component (B), a component (C), a component (D), and a component (E).

Examples of a method of mixing the component (A) and, as necessary, the component (B) to the component (E) include the following methods (1) to (3).

(1) Method in which the component (A) and, as necessary, the component (B) to the component (E) are mixed using a Henschel mixer or the like, supplied to a melt kneader, and kneaded.

(2) Method in which a mixture obtained by mixing the thermoplastic resin, the component (A1), and, as necessary, the component (C) to the component (E) in advance using a Henschel mixer or the like is prepared with a single-screw or twin-screw extruder, the mixture is supplied to a melt kneader and kneaded, and then the component (B) is optionally blended from a side feeder.

(3) Method which is a combination of the above methods (1) and (2), in which the component (B) is supplied together with other raw materials at an initial stage and is also supplied from a feeder again.

In the method of supplying the components constituting the resin composition to the melt kneader, all of the constitutional components may be supplied to the same supply port at once, or the constitutional components may be supplied from different supply ports.

In a case where the polyamide (A1) contains the aliphatic polyamide (A1-1), a melt kneading temperature is preferably a temperature higher than a melting point of the aliphatic polyamide (A1-1) by about 1° C. or more and 100° C. or less, and more preferably a temperature higher than the melting point of the aliphatic polyamide (A1-1) by 10° C. or more and 50° C. or less.

A shear rate in the kneader is preferably about 100 sec$^{-1}$ or more. In addition, an average retention time during kneading is preferably about 0.5 minutes or longer and 5 minutes or shorter.

As a device for performing melt kneading, any known device may be used, and for example, a single-screw or twin-screw extruder, a Banbury mixer, a melt kneader (mixing roll or the like), and the like are preferably used.

A blending amount of each component when manufacturing the resin composition is the same as the content of each component in the resin composition described above.

[Physical Properties of Resin Composition]

A glass transition temperature Tg of the resin composition is preferably 75° C. or higher, more preferably 75° C. or higher and 220° C. or lower, still more preferably 80° C. or higher and 210° C. or lower, particularly preferably 85° C.

or higher and 200° C. or lower, and most preferably 90° C. or higher and 150° C. or lower.

By setting the glass transition temperature Tg of the resin composition to be in the above numerical range, glossiness of the formed article and printing sharpness by laser marking become superior.

The glass transition temperature Tg of the resin composition can be measured by, for example, a dynamic viscoelasticity measuring instrument.

Specifically, as the measurement with the dynamic viscoelasticity measuring instrument, for example, the glass transition temperature Tg is set to a peak top temperature of a peak at which, when measurement is performed at an applied frequency of 8 Hz while raising the temperature from 23° C. at a temperature rise rate of 2° C./min, a storage modulus significantly decreases and a loss modulus reaches its maximum. In a case where two or more peaks of the loss modulus appear, the glass transition temperature Tg is set to the peak top temperature of the peak on the highest temperature side. A frequency of the measurement at this time is set to at least one or more measurements every 20 seconds in order to improve accuracy of the measurement.

In addition, a method of preparing a sample for the measurement is not particularly limited, but from the viewpoint of eliminating an influence of molding strain, it is desirable to use a cut-out piece of a hot press molded article. In addition, from the viewpoint of thermal conduction, it is desirable that a size (width and thickness) of the cut-out piece is as small as possible.

A crystallization temperature of the resin composition is preferably 240° C. or lower, more preferably 120° C. or higher and 235° C. or lower, still more preferably 130° C. or higher and 230° C. or lower, and particularly preferably 140° C. or higher and 225° C. or lower.

By setting the crystallization temperature of the resin composition to be in the above numerical range, the bonding strength of the formed article obtained by laser welding can be improved, and the appearance of the bonded point can be improved.

The crystallization temperature of the resin composition can be measured by, for example, DSC.

Specifically, as the measurement by DSC, for example, the crystallization temperature is set to a peak top temperature of an endothermic peak that appears when a temperature is raised from 23° C. at a temperature rise rate of 10° C./min. In a case where two or more endothermic peaks appear, the crystallization temperature is set to the peak top temperature of the endothermic peak on the highest temperature side.

An enthalpy of the endothermic peak at this time is desirably 10 J/g or more, and more desirably 20 J/g or more. In addition, at the time of measurement, it is desirable to use a sample which is heated once to a temperature condition of the melting point+20° C. or higher to melt the resin and is then cooled to 23° C. at a temperature decrease rate of 10° C./min.

<Welding Method and Method of Manufacturing Formed Article>

The above-described formed article can be manufactured, for example, by the method described below.

That is, a method of manufacturing a formed article obtained by laser welding of the present embodiment (hereinafter, sometimes simply abbreviated as "manufacturing method of the present embodiment") includes a welding method of performing laser welding on a formed article obtained by molding a resin composition containing a thermoplastic resin (hereinafter, referred to as "welding method" or "laser welding method").

In the welding method, laser welding is performed so that, when a laser-welded portion of the obtained formed article is cut at a cross section that includes a normal to the transmitting resin member or the absorbing resin member and is orthogonal to a scanning direction of a laser beam, an area of a molten pool is 0.210 mm$^2$ or more and 1.00 mm$^2$ or less.

In the manufacturing method of the present embodiment, with the above-described configuration, the bonding strength by laser welding can be improved, and a formed article having good appearance at a bonded point can be obtained.

That is, the manufacturing method of the present embodiment can also be called a laser welding method for performing laser welding processing on a formed article so that high bonding strength and good appearance at the bonded point are achieved.

[Laser Welding Method]

Examples of a laser used in the laser welding method include a carbon dioxide laser, an Nd-YAG laser, a YAG laser, a ruby laser, a semiconductor laser, an argon laser, and an excimer laser. Particularly, an Nd-YAG laser, a YAG laser, or a semiconductor laser is preferable from the viewpoint of welding processing.

A wavelength of the laser to be used is usually 193 nm or longer and 1,100 nm or shorter, preferably in three wavelength bands of 220 nm or longer and 250 nm or shorter, 520 nm or longer and 550 nm or shorter, and 850 nm or longer and 1,100 nm or shorter, more preferably in two wavelength bands of 520 nm or longer and 550 nm or shorter and 850 nm or longer and 1,050 nm or shorter, and still more preferably in a wavelength band of 900 nm or longer and 1,000 nm or shorter.

By performing the processing in these wavelength bands, the laser is efficiently absorbed by the colorant or the resin, a thermal load on the resin on the transmission side is suppressed, and the appearance of the bonded point is improved.

From the viewpoint of reducing a tact time, a scanning speed of laser welding is usually 0.1 mm/see or faster and 3,000 mm/see or slower, preferably 1 mm/see or faster and 2,000 mm/see or slower, more preferably 5 mm/see or faster and 1,000 mm/see or slower, and still more preferably 10 mm/see or faster and 500 mm/see or slower.

By setting the scanning speed to be equal to or faster than the above lower limit, it is possible to prevent a laser absorption amount from becoming excessive and to suppress deterioration of the appearance of the laser-welded point due to heating. In addition, by setting the scanning speed to be equal to or slower than the above upper limit, a sufficient amount of the energy of the laser is absorbed, and uniform melting is achieved, so that the improvement and stabilization of the bonding strength can be achieved.

A processing output of the laser welding is usually 1.0 W or more and 1,000.0 W or less, preferably 5.0 W or more and 800.0 W or less, and more preferably 10.0 W or more and 500.0 W or less.

By setting the processing output to be equal to or more than the above lower limit, sufficient energy is absorbed from the laser, and uniform melting is achieved, so that the improvement and stabilization of the bonding strength can be achieved. In addition, by setting the scanning speed to be equal to or less than the above upper limit, it is possible to prevent the laser absorption amount from becoming excessive and to suppress the deterioration of the appearance of the laser-welded point due to heating.

A frequency of the laser welding is usually 1 kHz or more and 1,000 kHz or less, or continuous wave, preferably 5 kHz or more and 750 kHz or less, or continuous wave, and more preferably 10 kHz or more and 500 kHz or less, or continuous wave. By setting the frequency to be equal to or more than the above lower limit, welding is performed without gaps, and it is possible to improve the bonding strength and to enhance airtightness. In addition, by setting the frequency to be equal to or less than the above upper limit, it is possible to prevent a peak power of the laser from becoming too low and to suppress a decrease in the strength of the welded point. In addition, the continuous wave is also a preferable form because welding can be performed without gaps.

A laser spot diameter of the laser welding is usually 0.1 mm or more and 10 nm or less, preferably 0.5 mm or more and 6 mm or less, and more preferably 1 mm or more and 4 mm or less.

By setting the spot diameter to be equal to or more than the above lower limit, it is possible to prevent the energy from becoming excessive and to suppress burning of the welded portion and deterioration of the appearance. In addition, by setting the spot diameter to be equal to or less than the above upper limit, it is possible to prevent application of energy insufficient for melting due to the dispersion of the energy and failure in welding, and to suppress a decrease in the strength of the welded point.

A pitch interval of the laser welding is usually 0.1 m or more and 500 µm or less, preferably 1 µm or more and 250 µm or less, and more preferably 5 µm or more and 250 µm or less.

By setting the pitch interval to be equal to or more than the above lower limit, it is possible to prevent the laser absorption amount from becoming too large and to suppress the deterioration of the appearance of the laser-welded point due to heating. In addition, by setting the scanning speed to be equal to or less than the above upper limit, sufficient energy is absorbed from the laser, and uniform melting is achieved, so that the improvement and stabilization of the bonding strength can be achieved.

[Molding Step]

The manufacturing method of the present embodiment may further include a molding step before a laser welding step by the welding method.

In the molding step, the above-described resin composition is molded to obtain an intermediate formed article that does not have a bonded portion by laser welding.

A method for obtaining the intermediate formed article is not particularly limited, and a known molding method can be used.

Examples of the known molding method include extrusion molding, injection molding, vacuum molding, blow molding, injection compression molding, decorative molding, multi-material molding, gas-assisted injection molding, foam injection molding, low pressure molding, ultra-thin wall injection molding (ultra-high-speed injection molding), and in-mold composite molding (insert molding, outsert molding).

<Application of Formed Article>

Since the formed article of the present embodiment has a high bonding strength through laser welding and has a good appearance at the bonded part, the formed article can be used for various applications.

As applications of the formed article of the present embodiment, for example, the formed article of the present embodiment can be suitably used in automobile fields, electrical and electronic fields, mechanical and industrial fields, transportation components for fluids such as air or liquids, office equipment fields, and aerospace fields.

The formed article of the present embodiment can be suitably used particularly as an electrical and electronic component in applications of the electrical and electronic fields such as a battery housing of a lithium secondary battery, a current measurement component, a magnet switch housing, a breaker housing, various switch components, a camera module housing, a camera module, a lens barrel (lens tube), and a formed article for a connector, and more suitably used in a battery housing of a lithium secondary battery, a magnet switch housing, a breaker housing, a camera module housing, a camera module, a lens barrel (lens tube), or a formed article for a connector.

EXAMPLES

Hereinafter, the present invention will be described in detail with reference to specific examples and comparative examples, but the present invention is not limited to the following examples.

Each constitutional component of resin compositions used for formed articles of the examples and comparative examples will be described.

<Constitutional Component>

[Aliphatic Polyamide (A1-1)]
  A1-1-1: Polyamide 66
[Semi-Aromatic Polyamide (A1-2)]
  A1-2-1: Polyamide 6I
  A1-2-2: polyamide 66/6I (copolymer)
[Filler (B)]
  B-1: Glass fiber (GF) (manufactured by Nippon Electric Glass Co., Ltd., trade name "ECS03T275H", average fiber diameter 10 amp, cut length 3 mm)
[Flame Retardant (C)]
  C-1: Phosphinic acid-based flame retardant Aluminum diethylphosphinate (manufactured by Clariant, trade name: "Exolit OP 1230")
[Colorant (D)]
  D1: Carbon black (primary particle diameter: 27 nm)

<Manufacturing of Polyamide>

Details of methods of manufacturing the aliphatic polyamide A1-1-1, the semi-aromatic polyamide A1-2-1, and the semi-aromatic polyamide A1-2-2 will be described below. The aliphatic polyamide A1-1-1, the semi-aromatic polyamide A1-2-1, and the semi-aromatic polyamide A1-2-2 obtained by the following manufacturing methods were dried in a nitrogen stream, adjusted to a moisture content of about 0.2 mass %, and then used as raw materials of the resin compositions used for the formed articles of the examples and comparative examples described later.

Synthesis Example 1

(Synthesis of Aliphatic Polyamide A1-1-1 (Polyamide 66))

A polymerization reaction of a polyamide was carried out as follows by the "hot melt polymerization method".

First, 1,500 g of an equimolar salt of adipic acid and hexamethylenediamine was dissolved in 1,500 g of distilled water to produce an equimolar 50 mass % homogeneous aqueous solution of raw material monomers. This aqueous solution was charged into an autoclave with an internal volume of 5.4 L, and the autoclave was purged with nitrogen. Next, while stirring the aqueous solution at a temperature of about 110° C. or higher and 150° C. or lower, the aqueous solution was concentrated to a solution concentration of 70 mass % by gradually removing water vapor. Next, an internal temperature of the autoclave was raised to 220° C. At this time, a pressure of the autoclave was increased to 1.8 MPa. A reaction was then allowed for 1 hour as it is and for 1 hour while maintaining the pressure at 1.8 MPa by gradually removing water vapor until the internal temperature reached 245° C. Then, the pressure was lowered over 1 hour. Next, an inside of the autoclave was maintained under a reduced pressure of 650 torr (86.66 kPa) with a vacuum apparatus for 10 minutes. At this time, a final internal temperature for the polymerization was 265° C. Next, the inside of the autoclave was pressurized with nitrogen to produce strands from a lower spinneret (nozzle), and the strands were cooled with water and cut to be discharged into pellets. Next, the pellets were dried in a nitrogen atmosphere at 100° C. for 12 hours, thereby obtaining the aliphatic polyamide A1-1-1 (polyamide 66).

Synthesis Example 2

(Synthesis of Semi-Aromatic Polyamide A1-2-1 (Polyamide 6I))

A polymerization reaction of a polyamide was carried out as follows by the "hot melt polymerization method".

First, 1,500 g of an equimolar salt of isophthalic acid and hexamethylenediamine, adipic acid exceeding 1.5 mol % with respect to the entire equimolar salt components, and 0.5 mol % of acetic acid were dissolved in 1,500 g of distilled water to produce an equimolar 50 mass % homogeneous aqueous solution of raw material monomers. Next, while stirring the aqueous solution at a temperature of about 110° C. or higher and 150° C. or lower, the aqueous solution was concentrated to a solution concentration of 70 mass % by gradually removing water vapor. Next, an internal temperature of the autoclave was raised to 220° C. At this time, a pressure of the autoclave was increased to 1.8 MPa. A reaction was then allowed for 1 hour as it is and for 1 hour while maintaining the pressure at 1.8 MPa by gradually removing water vapor until the internal temperature reached 245° C. Then, the pressure was lowered over 30 minutes. Next, an inside of the autoclave was maintained under a reduced pressure of 650 torr (86.66 kPa) with a vacuum apparatus for 10 minutes. At this time, a final internal temperature for the polymerization was 265° C. Next, the inside of the autoclave was pressurized with nitrogen to produce strands from a lower spinneret (nozzle), and the strands were cooled with water and cut to be discharged into pellets. Next, the pellets were dried in a nitrogen atmosphere at 100° C. for 12 hours, thereby obtaining the semi-aromatic polyamide A1-2-1 (polyamide 6I).

Synthesis Example 3

(Synthesis of Semi-Aromatic Polyamide A1-2-2 (Polyamide 66/6I (Copolymer)))

2.00 kg of an equimolar salt of adipic acid and hexamethylenediamine, 0.50 kg of an equimolar salt of isophthalic acid and hexamethylenediamine, and 2.5 kg of pure water were charged into a 5 L autoclave and stirred well. After sufficiently purging the autoclave with nitrogen, a temperature was raised from room temperature to 220° C. over about 1 hour while stirring. At this time, an internal pressure reached 18 kg/cm$^2$G due to a natural pressure of water vapor in the autoclave, but heating was continued while removing water from a reaction system so that the pressure did not reach 18 kg/cm$^2$G or higher. Furthermore, when the internal temperature reached 260° C. after 2 hours, the heating was stopped, a discharge valve of the autoclave was closed, and the cooling was performed to room temperature over about 8 hours. After the cooling, the autoclave was opened, and about 2 kg of the polymer was taken out and pulverized. The obtained pulverized polymer was placed in a 10 L evaporator and subjected to solid state polymerization under a nitrogen stream at 200° C. for 10 hours. Next, the inside of the autoclave was pressurized with nitrogen to produce strands from a lower spinneret (nozzle), and the strands were cooled with water and cut to be discharged into pellets. Next, the pellets were dried in a nitrogen atmosphere at 100° C. for 12 hours, thereby obtaining the semi-aromatic polyamide A1-2-2 (polyamide 66/6I).

<Manufacturing of Resin Composition>

Manufacturing Example 1

Using a TEM 35 mm twin-screw extruder manufactured by Shibaura Machine Co., Ltd. (set temperature: 280° C., screw rotation speed 300 rpm), the aliphatic polyamide A1-1-1 and the semi-aromatic polyamide A1-2-1, which were blended in advance, were supplied through a top feed port at a most upstream portion of the extruder. Next, a melt-kneaded product extruded from a die head was cooled into a strand form and pelletized to obtain pellets of the resin composition. Blending amounts were set as shown in Table 1.

Manufacturing Examples 2 to 7

Each resin composition was manufactured using the same method as described in Manufacturing Example 1 except that the blending amounts of the components (A) to (C) were set as shown in Table 1, and filler B-1 was supplied through a side feed port on a downstream side of the extruder (a state in which the resin supplied through the top feed port was sufficiently melted).

TABLE 1

|  |  | Manufacturing Example | | | | | | |
|---|---|---|---|---|---|---|---|---|
|  |  | 1 | 2 | 3 | 4 | 5 | 6 | 7 |
| Thermoplastic resin (parts by mass) | Aliphatic polyamide (A1-1-1) | 80.0 | 100.0 | 60.0 | 72.0 | 72.0 |  | 100.0 |
|  | Semi-aromatic polyamide (A1-2-1) | 20.0 |  | 40.0 | 28.0 | 28.0 |  |  |
|  | Semi-aromatic polyamide (A1-2-2) |  |  |  |  |  | 100.0 |  |
| Filler (B) (parts by mass) | Glass fiber (B-1) | 46.0 | 46.0 | 130.0 | 50.0 | 100.0 | 50.0 | 50.0 |
| Flame retardant (C) (parts by mass) | Flame retardant (C-1) | 37.0 | 37.0 | 27.0 |  |  |  |  |
|  | Total (parts by mass) | 183.0 | 183.0 | 257.0 | 150.0 | 200.0 | 150.0 | 150.0 |

<Physical Properties and Evaluation>

First, pellets of each of resin compositions obtained in Manufacturing Examples 1 to 7 were dried in a nitrogen stream to adjust a moisture content in the resin composition to 500 ppm or less. Next, various physical properties of the pellets of each resin composition in which the moisture content was adjusted were measured using the following methods. In addition, measurement of various physical properties and various evaluations were conducted on the formed articles described later.

[Physical Property 1]
(Glass transition temperature Tg)

For the pellets of each of the resin compositions obtained in Manufacturing Examples 1 to 7, using a PS40E injection molding machine manufactured by NISSEI PLASTIC INDUSTRIAL CO., LTD., a cooling time of 15 seconds, a screw rotation speed of 100 rpm, a cylinder temperature of 290° C., and a mold temperature of 80° C. were set, and an injection pressure and an injection speed were appropriately adjusted so that a filling time was in a range of 1.5 seconds±0.1 seconds, whereby a formed article according to JIS-K 7139 was molded. The formed article was measured under the following conditions using a dynamic viscoelasticity evaluation device (EPLEXOR 500N manufactured by GABO).

(Measurement Conditions)
Measurement mode: Tensile
Measurement frequency: 8 Hz
Temperature rise rate: 3° C./min
Temperature range: −100° C. or higher and 250° C. or lower A ratio (E2/E1) of a loss modulus E2 to a storage modulus E1 was defined as tan δ, and a temperature at which tan S reached its local maximum point was defined as a glass transition temperature Tg.

[Physical Property 2]
(Crystallization Peak Temperature)

A crystallization peak temperature was measured as follows using Diamond-DSC manufactured by PerkinElmer, Inc. according to JIS-K 7121. The measurement was performed in a nitrogen atmosphere.

First, a temperature of about 10 mg of the resin composition was raised from 50° C. to 350° C. at a temperature rise rate of 20° C./min. Subsequently, the resin composition was held at 350° C. for 3 minutes, and then cooled from 350° C. to 50° C. at a cooling rate of 20° C./min. After holding the resin composition at 50° C. for 3 minutes, the temperature was raised from 50° C. to 350° C. again at a temperature rise rate of 20° C./min. Furthermore, the resin composition was held at 350° C. for 3 minutes and then cooled from 350° C. to 50° C. at a cooling rate of 20° C./min. The crystallization peak temperature appearing at this time was measured.

Table 2 shows measurement results of physical property 1 (glass transition temperature Tg) and physical property 2 (crystallization peak temperature).

(Preparation of Test Piece 1 for Laser Welding)

For the pellets of each of the resin compositions obtained in Manufacturing Examples 1 to 7, using an injection molding machine [IS150E manufactured by Shibaura Machine Co., Ltd.], a cooling time of 15 seconds, a screw rotation speed of 100 rpm, a cylinder temperature of 290° C., and a mold temperature of 80° C. were set, and an injection pressure and an injection speed were appropriately adjusted so that a filling time was in a range of 0.4±0.1 seconds, whereby Test Piece 1 for laser welding (6 cm×2.5 cm, thickness 2 mm) was produced.

(Preparation of Test Piece 2 for Laser Welding)

The pellets of the resin composition obtained in Manufacturing Example 1 were dry-blended with a laser welding coloring masterbatch (Orient Chemical Industries Co., Ltd.: eBIND ACW-9871, hereinafter simply referred to as ACW) at a dilution ratio of 60 times, using an injection molding machine (IS150E manufactured by Shibaura Machine Co., Ltd.), a cooling time of 15 seconds, a screw rotation speed of 100 rpm, a cylinder temperature of 290° C., and a mold temperature of 80° C. were set, and an injection pressure and an injection speed were appropriately adjusted so that a filling time was in a range of 0.4±0.1 seconds, whereby Test Piece 2 for laser welding (60 mm 25 mm, thickness 2 mm) was produced.

(Preparation of Test Piece 3 for Laser welding)

For the pellets of each of the resin compositions obtained in Manufacturing Examples 1 to 7, the colorant D1 was dry-blended with respect to 100 parts by mass of the resin composition at 1,500 ppm, using an injection molding machine (IS150E manufactured by Shibaura Machine Co., Ltd.), a cooling time of 15 seconds, a screw rotation speed of 100 rpm, a cylinder temperature of 290° C., and a mold temperature of 80° C. were set, and an injection pressure and an injection speed were appropriately adjusted so that a filling time was in a range of 0.4±0.1 seconds, whereby Test Piece 3 for laser welding (60 mm, 25 mm, thickness 2 mm) was produced.

(Preparation of Test Piece 4 for Laser Welding)

For the pellets of each of the resin compositions obtained in Manufacturing Examples 1 to 7, using an injection molding machine [IS150E manufactured by Shibaura Machine Co., Ltd.], a cooling time of 15 seconds, a screw rotation speed of 100 rpm, a cylinder temperature of 290° C., and a mold temperature of 30° C. were set, and an injection pressure and an injection speed were appropriately adjusted so that a filling time was in a range of 0.4±0.1 seconds, whereby Test Piece 4 for laser welding (6 cm×2.5 cm, thickness 2 mm) was produced.

(Laser Welding Processing and Bonding Strength Measurement)

Figure 3:
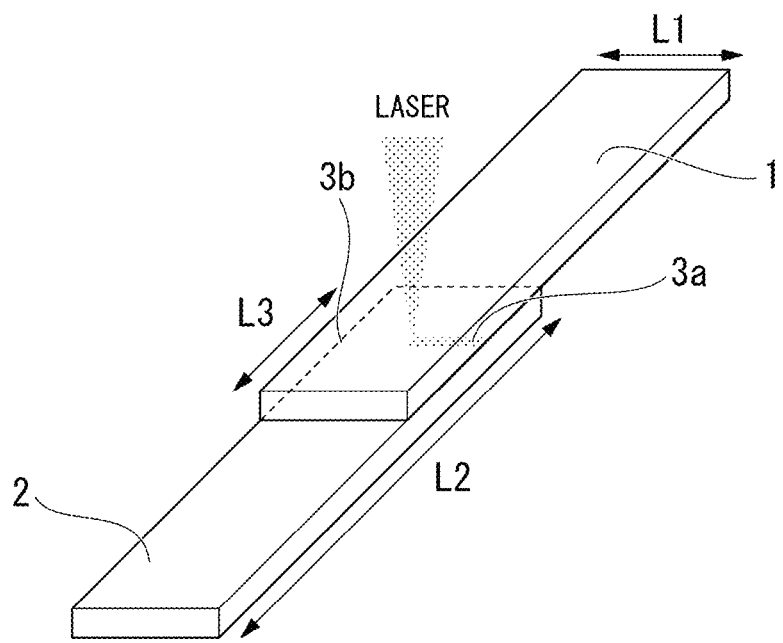
FIG. 3 is a schematic view for describing laser welding.

The laser welding processing will be described with reference to FIG. 3. Test Pieces 1 to 4 for laser welding were combined as shown in Tables 3 to 5, and both the members, the transmitting resin member 1 and the absorbing resin

TABLE 2

| | | Manufacturing Example | | | | | | |
|---|---|---|---|---|---|---|---|---|
| | | 1 | 2 | 3 | 4 | 5 | 6 | 7 |
| Tg (° C.) | Viscoelasticity measurement | 105.0 | 89.0 | 120.0 | 105.0 | 105.0 | 94.0 | 80.0 |
| Crystallization peak temperature (° C.) | Temperature decrease: 20° C./min | 205.0 | 220.5 | 206.0 | 220.0 | 215.0 | 204.0 | 222.0 | member 2, were overlapped and fixed so that L3 was 20 mm in a longitudinal direction. L1 in FIG. 3 is 25 mm, and L2 is 60 mm. Furthermore, a glass plate (a square measuring 15 cm in length and width and 10 mm in thickness) was pressed against an upper surface of the transmitting resin member 1 to fix a position of each resin member and to increase a cooling efficiency of the resin that generates heat during laser irradiation. In this state, the laser was irradiated in a direction parallel to L1 from 3a to 3b in FIG. 3, and linear laser irradiation was performed once to prepare a test piece. In addition, cooling was also performed by simultaneously blowing air to prepare a test piece. 3a and 3b in FIG. 3 indicate end portions positioned in a central 10 mm portion of L3. In addition, a wavelength and a frequency of the laser were set as follows.

Laser wavelength: 940 nm
Laser frequency: Continuous wave (CW wave)

Absorption side in Tables 3 to 5 is a side on which the light that has passed through the transmission side is incident. An output and a scanning speed of the laser are described in Tables 3 to 5. A spot diameter of the laser was 2.4 mm in diameter.

For the laser welding test pieces produced by the above method, welded points were visually checked, and the appearance was determined. Determination criteria were classified and evaluated according to the following three classifications.

A: The appearance is good, and the laser-welded point is not noticeable.
B: The laser-welded point has a different gloss from that of the surrounding area, and it is apparent that it is a welded point.
C: The laser-welded point is burnt.

The test piece that has been laser-welded by the above-described method was sandwiched between chucks at both end portions of the absorption side and the transmission side using a universal material tester manufactured by Instron using a load cell of 30 kN, and was subjected to a tensile test under test conditions of a chick-to-chuck distance of 55 mm and a tensile test speed of 5.0 mm/min, and a maximum point load was measured. The tensile test was conducted at 5 points for each sample.

Figure 4:
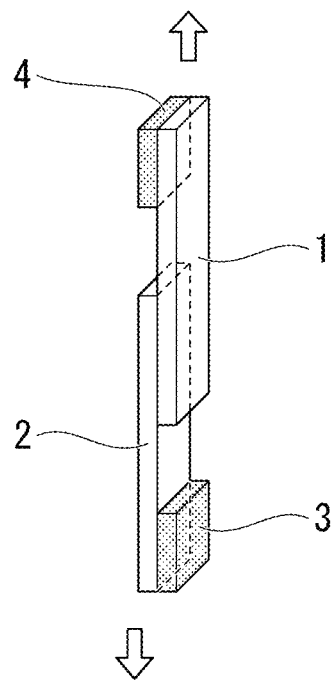
FIG. 4 is a schematic view for describing a method of measuring a bonding strength.

In the tensile test, each of the transmitting resin member 1 and the absorbing resin member 2 was pulled in a direction indicated by the arrow in FIG. 4. A plate material 3 and a plate material 4 are spacers installed for attaching the transmitting resin member 1 and the absorbing resin member 2 to a measuring device. The plate material 3 and the plate material 4 each have the same thickness as the transmitting resin member 1 and the absorbing resin member 2.

In addition, a fracture mode after the tensile test was also checked. A case where a base material was broken starting from the bonded point, or a case where a fracture had occurred in a state where a portion of the base material on the transmission side or the base material on the absorption side was welded to the other side was counted as base material fracture.

A state where the base material fracture had occurred means that bonding by laser welding is sufficiently performed. On the other hand, a case where peeling occurs at an interface without the base material fracture means that the absorbing resin member is not melted, or the heat of the absorbing resin member is not sufficiently absorbed by the transmitting resin member, resulting in an unstable bonding state.

Therefore, a higher proportion of base material fracture indicates a more stable bonding state, which is desirable in laser welding.

(Observation of Molten Pool)
Method of Acquiring Cross Section

The test piece that has been laser-welded by the above method was cut to longitudinally cross a center of a short side including the bonded pant, whereby a cross section was prepared in a direction perpendicular to the scanning direction of the laser light and a molten pool was exposed.

That is, the formed article was cut in a direction including a normal to the transmitting resin member or the absorbing resin member and orthogonal to the scanning direction of the laser beam.

Unnecessary parts unrelated to the observation of the molten pool were cut off, and an observation piece containing the molten pool was embedded in Epomount manufactured by Refine Tec Ltd. As curing conditions, the observation piece was left to stand in an environment of 40° C. for 12 hours.

After the embedding chemical solution had cured, an observation surface was polished with a rotary polishing device (MA-600e manufactured by Musashino Denshi, INC.). A roughness of abrasive particles during the polishing was progressed in the order of 20 µm, 13 µm, 9 µm, 2 µm, and 0.5 µm.

Next, etching was performed. The test pieces using the resin compositions of Manufacturing Examples 1 and 3 to 6 were immersed in a 15 mol/L formic acid solution for 30 seconds and then observed. The test piece using the resin composition of Manufacturing Example 2 was immersed in a 15 mol/L formic acid solution for 300 seconds and then observed. The test piece using the resin composition of Manufacturing Example 7 was immersed in a 15 mol/L calcium chloride solution (solvent: ethanol) for 30 seconds and then observed.

For the observation of the molten pool, optical microscope observation was performed with VHX6000 manufactured by KEYENCE CORPORATION. A observation magnification was set to 50-fold, which is a magnification at which the entire molten pool was put in a visual field.

Method of Calculating Area of Molten Pool

On the optical microscope image of the cross section of the formed article obtained by the above-described method, an area of the molten pool was measured by a function of measuring an area of a designated region of the device. In the designation of the region for measuring the area of the molten pool, an outer circumferential portion of the molten pool was designated so that the outer circumferential portion passes through both ends of the length x of the largest diameter and both ends of the maximum diameter y perpendicular to x shown in FIG. 2.

(Glossiness Measurement)

In a central part of Test Piece 3 for laser welding, a 60-degree gloss (%) was measured using a glossmeter (IG320 manufactured by Horiba, Ltd.) according to JIS-K 7150. A higher measurement value indicates better glossiness, and a glossiness of 60% or more was determined to be good.

(Measurement of Beam Transmittance)

For Test Pieces 1, 2, or 4 for laser welding prepared as the transmitting resin members, a beam transmittance at a wavelength of 940 nm was measured using a device in which an integrating sphere "ILN-725" is combined with (V670) manufactured by JASCO Corporation. A higher transmittance indicates better beam transmittance, and a transmittance of 30% or more was evaluated as good.

A test piece was prepared with each resin composition according to the above-described method of preparing a test piece for laser welding, and then laser welding processing and evaluation were performed. Tables 3 to 5 summarize the combinations of the resin compositions of the test pieces and the types of test pieces used in each of the examples and the comparative examples, and the evaluation results.

TABLE 3

|  |  | Comparative Example 1 | Example 1 | Example 2 | Example 3 | Example 4 | Example 5 |
|---|---|---|---|---|---|---|---|
| Transmission side resin and test piece type | Resin Composition | Manufacturing Example 1 | Manufacturing Example 1 | Manufacturing Example 1 | Manufacturing Example 1 | Manufacturing Example 1 | Manufacturing Example 1 |
|  | Type of test piece for laser welding processing | Test Piece 1 | Test Piece 1 | Test Piece 1 | Test Piece 4 | Test Piece 1 | Test Piece 1 |
| Absorption side resin and test piece type | Resin Composition | Manufacturing Example 1 | Manufacturing Example 1 | Manufacturing Example 1 | Manufacturing Example 1 | Manufacturing Example 1 | Manufacturing Example 1 |
|  | Type of test piece for laser welding processing | Test Piece 3 | Test Piece 3 | Test Piece 3 | Test Piece 3 | Test Piece 3 | Test Piece 3 |
| Laser welding conditions | Scanning speed (mm/sec) | 100 | 100 | 100 | 100 | 100 | 50 |
|  | Output (W) | 325 | 375 | 425 | 425 | 475 | 150 |
| Bonding strength (N) |  | 1100 | 2150 | 2500 | 2560 | 2660 | 2400 |
| Number of base material fractures (number in n = 5) |  | 0 | 2 | 5 | 5 | 5 | 5 |
| Area of molten pool (mm$^2$) |  | 0.182 | 0.388 | 0.426 | 0.838 | 0.956 | 0.310 |
| Appearance evaluation |  | A | A | A | A | A | A |
| Glossiness |  | 73 | 73 | 73 | 73 | 73 | 73 |
| Beam transmittance of transmission side test piece (%) |  | 33.2 | 33.2 | 33.2 | 32.7 | 33.2 | 33.2 |

|  |  | Comparative Example 2 | Comparative Example 3 | Comparative Example 4 | Comparative Example 5 | Comparative Example 6 |
|---|---|---|---|---|---|---|
| Transmission side resin and test piece type | Resin Composition | Manufacturing Example 1 | Manufacturing Example 2 | Manufacturing Example 2 | Manufacturing Example 2 | Manufacturing Example 2 |
|  | Type of test piece for laser welding processing | Test Piece 2 | Test Piece 1 | Test Piece 1 | Test Piece 4 | Test Piece 1 |
| Absorption side resin and test piece type | Resin Composition | Manufacturing Example 1 | Manufacturing Example 2 | Manufacturing Example 2 | Manufacturing Example 2 | Manufacturing Example 2 |
|  | Type of test piece for laser welding processing | Test Piece 3 | Test Piece 3 | Test Piece 3 | Test Piece 3 | Test Piece 3 |
| Laser welding conditions | Scanning speed (mm/sec) | 50 | 20 | 20 | 20 | 100 |
|  | Output (W) | 150 | 375 | 425 | 425 | 425 |
| Bonding strength (N) |  | 1800 | 2200 | 2250 | 2340 | Not bonded |
| Number of base material fractures (number in n = 5) |  | 0 | 5 | 5 | 5 | — |
| Area of molten pool (mm$^2$) |  | 0.200 | 1.123 | 1.186 | 2.182 | — |
| Appearance evaluation |  | A | B | B | B | B |
| Glossiness |  | 71 | 56 | 56 | 56 | 56 |
| Beam transmittance of transmission side test piece (%) |  | 28.1 | 15.2 | 15.2 | 16.8 | 15.2 |

TABLE 4

|  |  | Comparative Example 7 | Example 6 | Example 7 | Example 8 |
|---|---|---|---|---|---|
| Transmission side resin and test piece type | Resin composition | Manufacturing Example 3 | Manufacturing Example 3 | Manufacturing Example 3 | Manufacturing Example 3 |
|  | Type of test piece for laser welding processing | Test Piece 1 | Test Piece 1 | Test Piece 1 | Test Piece 4 |
| Absorption side resin and test piece type | Resin composition | Manufacturing Example 3 | Manufacturing Example 3 | Manufacturing Example 3 | Manufacturing Example 3 |
|  | Type of test piece for laser welding processing | Test Piece 3 | Test Piece 3 | Test Piece 3 | Test Piece 3 |

TABLE 4-continued

| | | | | | |
|---|---|---|---|---|---|
| Laser welding conditions | Scanning speed (mm/sec) | 20 | 100 | 100 | 100 |
| | Output (W) | 75 | 250 | 325 | 325 |
| | Bonding strength (N) | 890 | 2050 | 2900 | 2500 |
| | Number of base material fractures (number in n = 5) | 0 | 2 | 5 | 5 |
| | Area of molten pool (mm$^2$) | 0.050 | 0.237 | 0.502 | 0.423 |
| | Appearance evaluation | A | A | A | A |
| | Glossiness | 71 | 71 | 71 | 71 |
| | Beam transmittance of transmission side test piece (%) | 33.3 | 33.3 | 33.3 | 32.7 |

| | | Example 9 | Comparative Example 8 | Example 10 |
|---|---|---|---|---|
| Transmission side resin and test piece type | Resin composition | Manufacturing Example 3 | Manufacturing Example 4 | Manufacturing Example 4 |
| | Type of test piece for laser welding processing | Test Piece 1 | Test Piece 1 | Test Piece 1 |
| Absorption side resin and test piece type | Resin composition | Manufacturing Example 3 | Manufacturing Example 4 | Manufacturing Example 4 |
| | Type of test piece for laser welding processing | Test Piece 3 | Test Piece 3 | Test Piece 3 |
| Laser welding conditions | Scanning speed (mm/sec) | 100 | 100 | 100 |
| | Output (W) | 375 | 150 | 175 |
| | Bonding strength (N) | 3200 | 1016 | 2600 |
| | Number of base material fractures (number in n = 5) | 5 | 0 | 5 |
| | Area of molten pool (mm$^2$) | 0.652 | 0.120 | 0.290 |
| | Appearance evaluation | A | A | A |
| | Glossiness | 71 | 77 | 77 |
| | Beam transmittance of transmission side test piece (%) | 33.3 | 68.2 | 68.2 |

TABLE 5

| | | Comparative Example 9 | Example 11 | Comparative Example 10 | Example 12 | Comparative Example 11 | Comparative Example 12 | Comparative Example 13 |
|---|---|---|---|---|---|---|---|---|
| Transmission side resin and test piece type | Resin composition | Manufacturing Example 5 | Manufacturing Example 5 | Manufacturing Example 6 | Manufacturing Example 6 | Manufacturing Example 7 | Manufacturing Example 7 | Manufacturing Example 7 |
| | Type of test piece for laser welding processing | Test Piece 1 | Test Piece 1 | Test Piece 1 | Test Piece 1 | Test Piece 1 | Test Piece 1 | Test Piece 4 |
| Absorption side resin and test piece type | Resin composition | Manufacturing Example 5 | Manufacturing Example 5 | Manufacturing Example 6 | Manufacturing Example 6 | Manufacturing Example 7 | Manufacturing Example 7 | Manufacturing Example 7 |
| | Type of test piece for laser welding processing | Test Piece 3 | Test Piece 3 | Test Piece 3 | Test Piece 3 | Test Piece 3 | Test Piece 3 | Test Piece 3 |
| Laser welding conditions | Scanning speed (mm/sec) | 100 | 100 | 100 | 100 | 100 | 100 | 100 |
| | Output (W) | 125 | 150 | 100 | 120 | 150 | 175 | 175 |
| | Bonding strength (N) | 1200 | 2800 | 1300 | 3150 | 1000 | 2800 | 1000 |
| | Number of base material fractures (number in n = 5) | 0 | 4 | 0 | 4 | 0 | 2 | 0 |
| | Area of molten pool (mm$^2$) | 0.138 | 0.310 | 0.176 | 0.344 | 0.261 | 0.320 | 0.224 |
| | Appearance evaluation | A | A | A | A | A | B | B |
| | Glossiness | 70 | 70 | 87 | 87 | 49 | 49 | 49 |
| | Beam transmittance of transmission side test piece (%) | 57.7 | 57.7 | 68.8 | 68.8 | 40.3 | 40.3 | 40.4 |

From Tables 3 to 5, in Examples 1 to 12 in which the area of the molten pool was 0.21 mm$^2$ or more and 1.00 mm$^2$ or less, the welding strength and the appearance of the welded portion were good.

On the other hand, in Comparative Examples 1, 2, and 7 to 10 in which the area of the molten pool was 0.21 mm$^2$ or less, the bonding strength was low, and in Comparative Examples 3, 4, and 5 in which the area of the molten pool was 1.00 mm$^2$ or more, the appearance of the laser-welded part was poor. In addition, in Comparative Examples 11 to 13 using the resin composition of Manufacturing Example 7 having a Tg of 80° C., the results were poor in at least two evaluations among the bonding strength, the appearance of the laser-welded part, and the glossiness.

From the above, it became clear that the formed article in which the area of the molten pool was within a specific numerical range is excellent in the bonding strength and the appearance of the welded part by laser welding.

INDUSTRIAL APPLICABILITY

According to the formed article and the manufacturing method of the present embodiment, it is possible to obtain a formed article excellent in bonding strength, reliability at a bonded portion, and appearance characteristics of a bonded point by laser welding processing. The formed article according to the present embodiment can be suitably used in, for example, automobile fields, electrical and electronic fields, mechanical and industrial fields, office equipment fields, and aerospace fields.

The invention claimed is:

1. A formed article obtained by performing laser welding on a transmitting resin member and an absorbing resin member, the formed article comprising:
   a bonded part where the transmitting resin member and the absorbing resin member are bonded to each other by the laser welding,
   wherein a molten pool is observed at the bonded part in a cross section that includes a normal to the transmitting resin member or the absorbing resin member and is orthogonal to a scanning direction of a laser beam,
   an area of the molten pool is 0.210 mm$^2$ or more and 1.00 mm$^2$ or less,
   the transmitting resin member and the absorbing resin member are each molded from a resin composition,
   the resin composition contains a thermoplastic resin,
   the thermoplastic resin contains at least a polyamide-based resin (A1), and
   a glass transition point temperature of the resin composition is 85° C. or higher.

2. The formed article according to claim 1, wherein the resin composition contains a filler (B).

3. The formed article according to claim 1, wherein the resin composition has a crystallization peak temperature of 220° C. or lower.

4. The formed article according to claim 1, wherein the transmitting resin member has a beam transmittance of 30% or more for a beam wavelength of 940 nm.

5. The formed article according to claim 1, wherein the resin composition contains 0 parts by mass or more and 150 parts by mass or less of a filler (B) with respect to 100 parts by mass of the thermoplastic resin.

6. The formed article according to claim 2, wherein the filler (B) is one or two or more of glass fiber, calcium carbonate, talc, mica, wollastonite, and milled fiber.

7. The formed article according to claim 1, wherein the polyamide-based resin (A1) is a semi-aromatic polyamide (A1-2) having an aromatic ring in a skeleton, or an alloy of the semi-aromatic polyamide (A1-2) and an aliphatic polyamide (A1-1).

8. The formed article according to claim 7, wherein a content ratio of an isophthalic acid component to 100 mol % of a dicarboxylic acid component constituting the semi-aromatic polyamide (A1-2) is 10 mol % or more.

9. The formed article according to claim 1, wherein the resin composition contains a flame retardant (C).

10. The formed article according to claim 9, wherein the flame retardant (C) is either or both of phosphinate and diphosphinate.

11. The formed article according to claim 10,
    wherein the phosphinate is a compound represented by General Formula (I), and
    the diphosphinate is a compound represented by General Formula (II),

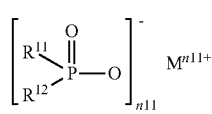
(I)

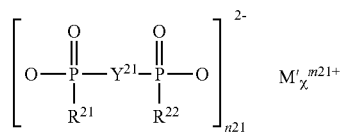
(II)

(in General Formula (I), R$^{11}$ and R$^{12}$ are each independently an alkyl group having 1 or more and 6 or less carbon atoms or an aryl group having 6 or more and 10 or less carbon atoms, M$^{n11+}$ is an n11-valent metal ion, M is an element belonging to Group 2 or Group 15 of a periodic table, a transition element, zinc, or aluminum, n11 is 2 or 3, and a plurality of R$^{11}$'s and R$^{12}$'s may be the same or different from each other in a case where n11 is 2 or 3, and in General Formula (II), R$^{21}$ and R$^{22}$ are each independently an alkyl group having 1 or more and 6 or less carbon atoms or an aryl group having 6 or more and 10 or less carbon atoms, Y$^{21}$ is an alkylene group having 1 or more and 10 or less carbon atoms or an arylene group having 6 or more and 10 or less carbon atoms, M'$^{m21+}$ is an m21-valent metal ion, M' is an element belonging to Group 2 or Group 15 of the periodic table, a transition element, zinc, or aluminum, n21 is an integer of 1 or more and 3 or less, a plurality of R$^{21}$'s, R$^{22}$'s, and Y$^{21}$'s may be the same or different from each other in a case where n21 is 2 or 3, m21 is 2 or 3, x is 1 or 2, a plurality of M''s may be the same or different from each other in a case where x is 2, and n21, x, and m21 are integers that satisfy a relational expression of 2×n21=m21×x).

12. The formed article according to claim 1, wherein the formed article has a sealed structure bonded by the laser welding.

13. The formed article according to claim 1, wherein the formed article is used for a battery case of a lithium secondary battery, for a sensor case, for a camera case, for an image or video capturing component housing, for a magnet switch housing, for a breaker housing, for a connector, for a secondary battery housing, for a current sensor case, for a camera module housing, for a camera module, or for a lens barrel (lens tube).

14. A welding method of performing laser welding on a transmitting resin member and an absorbing resin member,
    in which the transmitting resin member and the absorbing resin member are molded from a resin composition, and
    the resin composition contains a thermoplastic resin, the method comprising:
    performing laser welding on the transmitting resin member and the absorbing resin member to obtain a formed article in which
    an area of a molten pool observed at a portion joined by the laser welding in a cross section that includes a normal to the transmitting resin member or the absorbing resin member and is orthogonal to a scanning direction of a laser beam is 0.210 mm$^2$ or more and 1.00 mm$^2$ or less.

15. A method of manufacturing a formed article, using the welding method according to claim 14.

* * * * *